United States Patent
Moon

(10) Patent No.: US 10,152,217 B2
(45) Date of Patent: Dec. 11, 2018

(54) MOBILE TERMINAL INDICATING LAPSE OF TIME ASSOCIATED WITH A FUNCTION AND CONTROL METHOD THEREOF

(71) Applicant: LG ELECTRONICS INC., Seoul (KR)

(72) Inventor: Yoonji Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 188 days.

(21) Appl. No.: 14/995,085

(22) Filed: Jan. 13, 2016

(65) Prior Publication Data

US 2016/0132207 A1 May 12, 2016

Related U.S. Application Data

(63) Continuation of application No. 14/228,911, filed on Mar. 28, 2014, now Pat. No. 9,274,741.

(30) Foreign Application Priority Data

Nov. 15, 2013 (KR) .......................... 10-2013-0139409

(51) Int. Cl.
*G06F 3/0488* (2013.01)
*G06F 3/01* (2006.01)
(Continued)

(52) U.S. Cl.
CPC .......... *G06F 3/0488* (2013.01); *G06F 3/016* (2013.01); *G06F 3/0416* (2013.01);
(Continued)

(58) Field of Classification Search
CPC ...... G06F 3/0488; G06F 3/016; G06F 3/0416; G06F 3/1446; G06F 2203/04106;
(Continued)

(56) References Cited

U.S. PATENT DOCUMENTS

2008/0165141 A1* 7/2008 Christie .................. G06F 3/044
345/173
2008/0176604 A1* 7/2008 Kim ..................... G06F 3/04886
455/566

(Continued)

FOREIGN PATENT DOCUMENTS

| KR | 10-2009-0026949 | 3/2009 |
| KR | 10-2010-0044341 | 4/2010 |
| KR | 10-2012-0004928 | 1/2012 |

OTHER PUBLICATIONS

Korean Intellectual Property Office Application Serial No. 10-2013-0139409, Notice of Allowance dated Mar. 13, 2015, 2 pages.

*Primary Examiner* — Michael J Jansen, II
*Assistant Examiner* — Ivelisse Martinez Quiles
(74) *Attorney, Agent, or Firm* — Lee, Hong, Degerman, Kang & Waimey PC

(57) ABSTRACT

The present disclosure relates to a mobile terminal capable of carrying out time counting to execute a control function, and a control method thereof. The mobile terminal includes a display unit, and a controller configured to continuously display counting information for guiding the time counting on at least a part of an edge area of a display unit for a predetermined time when the time counting is executed in association with a terminal operation, and execute a control function associated with the terminal operation after a lapse of the predetermined time.

16 Claims, 21 Drawing Sheets

(51) Int. Cl.
  *G06F 3/16* (2006.01)
  *G06F 3/041* (2006.01)
  *G06F 3/14* (2006.01)
  *H04N 5/232* (2006.01)
  *G09G 5/18* (2006.01)

(52) U.S. Cl.
  CPC ............ *G06F 3/1446* (2013.01); *G06F 3/165* (2013.01); *G09G 5/18* (2013.01); *H04N 5/232* (2013.01); *G06F 2203/04101* (2013.01); *G06F 2203/04106* (2013.01)

(58) Field of Classification Search
  CPC .......... G06F 2203/04101; G06F 3/165; H04N 5/232; G09G 5/18
  See application file for complete search history.

(56) References Cited

U.S. PATENT DOCUMENTS

| | | | |
|---|---|---|---|
| 2009/0068990 A1* | 3/2009 | Kim | G06Q 10/109 455/412.1 |
| 2009/0069056 A1* | 3/2009 | Lee | G06F 1/3203 455/566 |
| 2011/0246943 A1* | 10/2011 | Fujibayashi | G06F 3/04847 715/833 |
| 2012/0011456 A1 | 1/2012 | Noda et al. | |
| 2012/0105579 A1* | 5/2012 | Jeon | H04N 5/2258 348/38 |
| 2013/0002133 A1 | 1/2013 | Jin et al. | |
| 2013/0097447 A1 | 4/2013 | Park et al. | |
| 2013/0145311 A1 | 6/2013 | Joo | |
| 2013/0170324 A1 | 7/2013 | Tu et al. | |
| 2013/0178248 A1 | 7/2013 | Kim | |
| 2013/0300697 A1* | 11/2013 | Kim | G06F 1/1626 345/173 |
| 2013/0326394 A1* | 12/2013 | Isensee | G06F 3/0481 715/781 |
| 2014/0033100 A1* | 1/2014 | Noda | G03B 17/40 715/769 |
| 2014/0118271 A1 | 5/2014 | Lee et al. | |
| 2014/0164972 A1 | 6/2014 | Lee | |
| 2014/0267097 A1 | 9/2014 | Lee et al. | |
| 2015/0015512 A1 | 1/2015 | Kwak et al. | |
| 2015/0015513 A1* | 1/2015 | Kwak | G06F 3/0416 345/173 |

\* cited by examiner

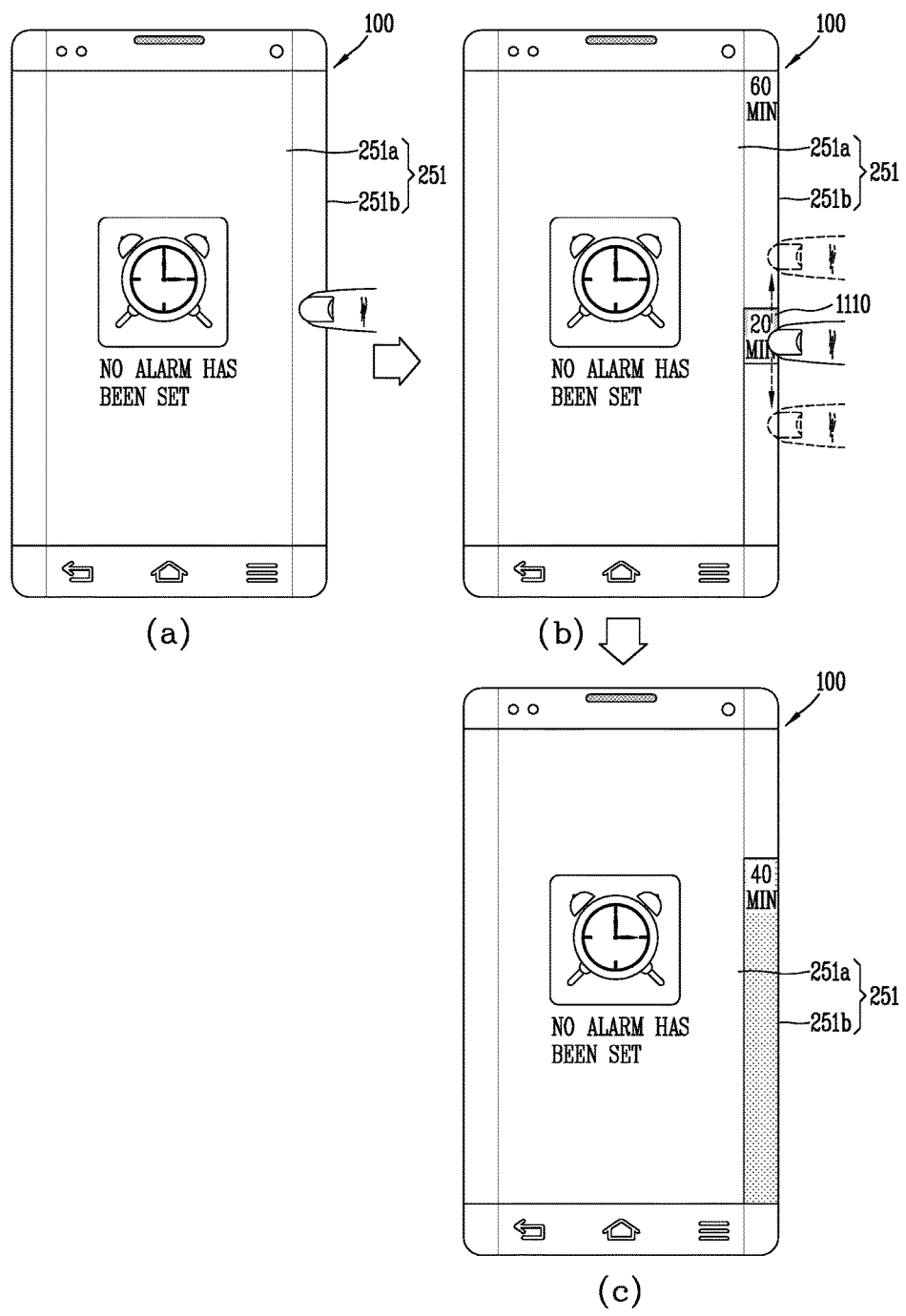

FIG. 14A
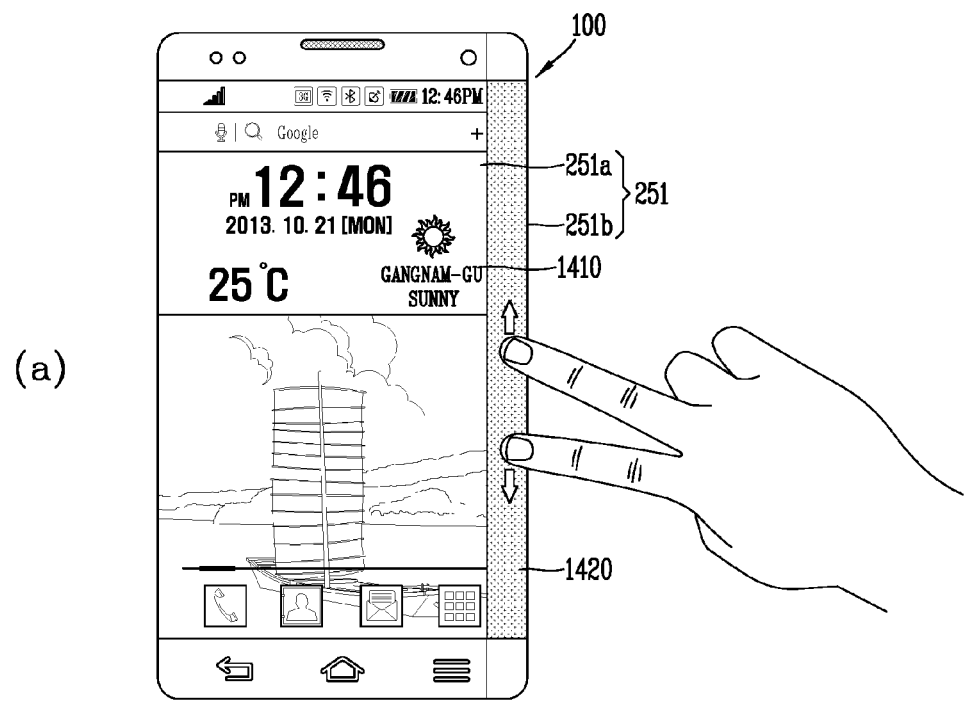
(a)
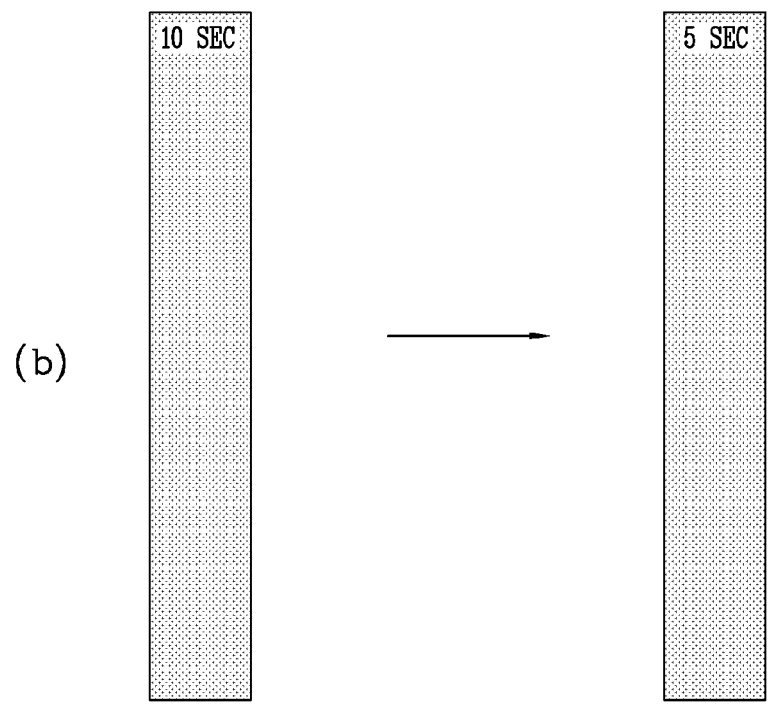
(b)

FIG. 14B
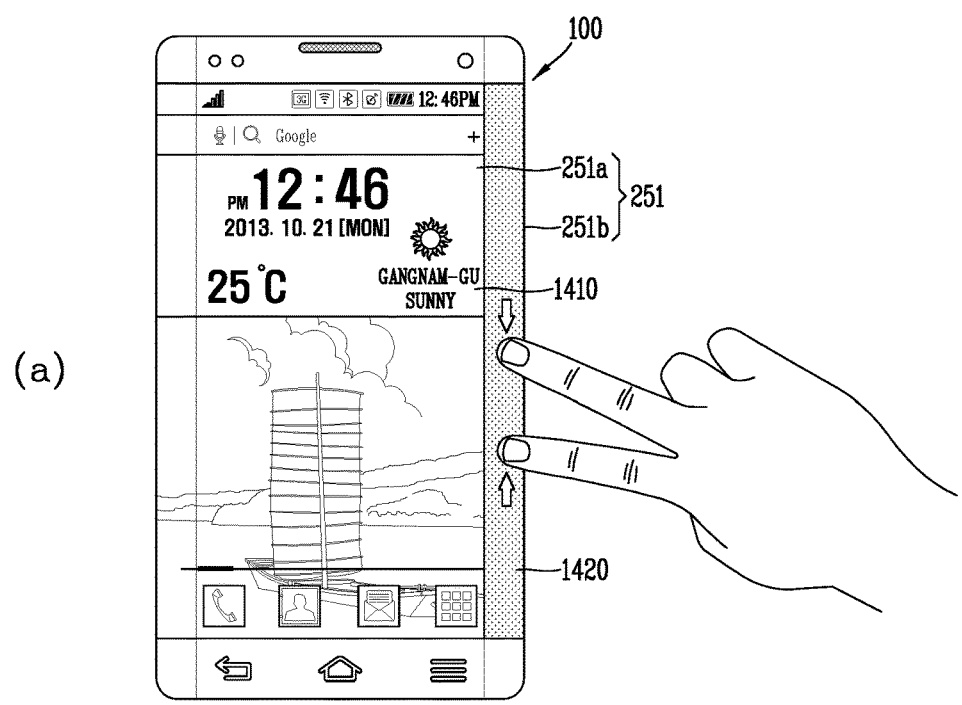
(a)
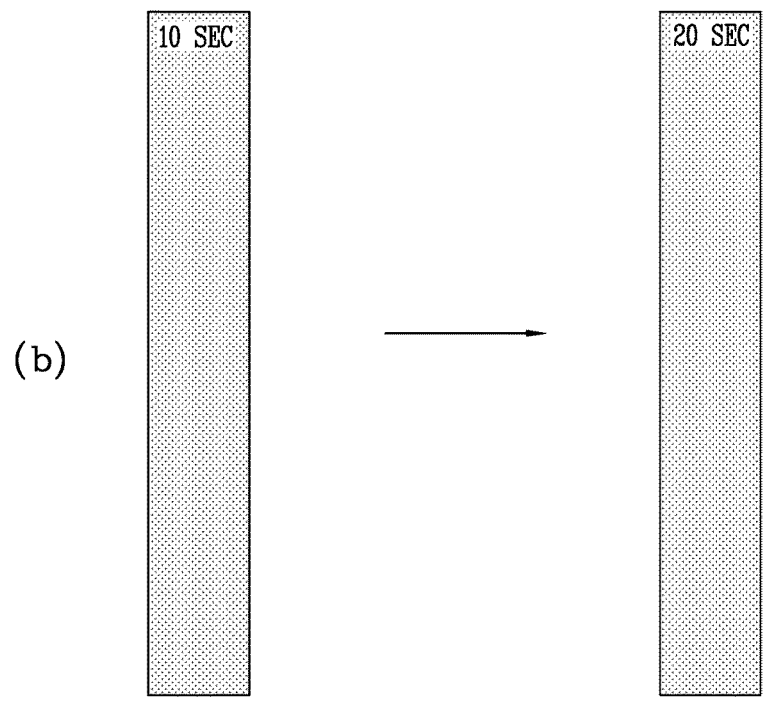
(b)

MOBILE TERMINAL INDICATING LAPSE OF TIME ASSOCIATED WITH A FUNCTION AND CONTROL METHOD THEREOF

CROSS-REFERENCE TO RELATED APPLICATIONS

This application is a continuation of U.S. patent application Ser. No. 14/228,911, filed on Mar. 28, 2014, now U.S. Pat. No. 9,274,741, which claims the benefit of earlier filing date and right of priority to Korean Application No. 10-2013-0139409, filed on Nov. 15, 2013, the contents of which are all hereby incorporated by reference herein in its entirety.

BACKGROUND OF THE DISCLOSURE

1. Field of the Disclosure

This specification relates to a mobile terminal having a side display unit.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements. As one example, a user interface environment for allowing a user to search for or select functions easily and conveniently is provided.

Furthermore, as a mobile terminal is considered as a personal belonging for expressing one's own personality, various design forms are required. The design forms include structural changes and improvements for the user to more conveniently use the mobile terminal. As one of the structural changes and improvements, a side display unit and a user interface using it may be taken into account.

SUMMARY OF THE DISCLOSURE

Therefore, an aspect of the detailed description is to provide a mobile terminal capable of outputting time counting using a side display unit.

Another aspect of the detailed description is to provide a mobile terminal capable of outputting a user notification and a user input which have a different form from the related art.

To achieve these and other advantages and in accordance with the purpose of this specification, as embodied and broadly described herein, there is provided a mobile terminal including a main body having a front surface and side surfaces, a display unit having a first area disposed on the front surface, and a second area extending from the first area and disposed on the side surfaces, and configured to output an execution screen in response to an execution of a function on at least one of the first and second areas, and a controller configured to execute time counting associated with the execution screen when a touch is applied to the second area while the execution screen is output, output counting information on the second area to inform the progressing of the time counting, and process the function related to the execution screen when the time counting is completed.

In one exemplary embodiment disclosed herein, the controller may set a predetermined time based on a touch point of the touch applied to the second area, and execute the time counting for the set predetermined time.

In one exemplary embodiment disclosed herein, an image whose size is gradually changed according to a lapse of time may be generated on the second area, and the counting information may be displayed within the image.

In one exemplary embodiment disclosed herein, the image may be processed in a different manner according to the touch point.

In one exemplary embodiment disclosed herein, the second area may include a left area and a right area disposed on left and right side surfaces of the main body, respectively, and the counting information may be output on at least one of the left area and the right area.

In one exemplary embodiment disclosed herein, while first counting information corresponding to a first function is output on one of the left area and the right area, the controller may output second counting information corresponding to a second function on the other when a new touch is applied to the other area.

In one exemplary embodiment disclosed herein, the mobile terminal may further include a camera disposed on the main body. The execution screen may be an execution screen for executing a function related to the camera. The controller may execute the time counting for executing a self-timer when a touch is applied to the second area, and capture an image caught on the camera when the time counting is completed.

In one exemplary embodiment disclosed herein, the execution screen may be an execution screen for executing a function related to an alarm, and the controller may set an alarm and execute time counting of the set alarm when a touch is applied to the second area.

In one exemplary embodiment disclosed herein, when an application which is different from an application associated with the execution screen is activated while the counting information is output, an execution screen of the different application may be output on the first area.

In one exemplary embodiment disclosed herein, the controller may stop the time counting and may not display the counting information when touch inputs, which are continuously applied to the second area with a time interval, are sensed.

In one exemplary embodiment disclosed herein, the first area may be deactivated and the counting information may be continuously displayed on the second area when the front surface is covered with an object while the counting information is displayed.

In accordance with one exemplary embodiment disclosed herein, there is provided a mobile terminal including a display, and a controller configured to continuously display counting information for showing time counting on at least a part of an edge area of the display unit for a predetermined time when the time counting is executed in association with a terminal operation, and execute a control function associated with the terminal operation after the lapse of the predetermined time.

In one exemplary embodiment disclosed herein, the controller may visually change the displayed counting information in cooperation with a time counted.

In one exemplary embodiment disclosed herein, the counting information may be changed according to a length of a time counted.

In one exemplary embodiment disclosed herein, the display unit may be divided into a first area for displaying the counting information, and a second area not displaying the counting information, and the first area may extend along at least one side of the display unit.

In one exemplary embodiment disclosed herein, the first area may include a left area and a right area disposed on left and right side surfaces of the main body, respectively, and the counting information may be output on at least one of the left area and the right area.

In one exemplary embodiment disclosed herein, the counting information may include first counting information and second counting information, each of which is counted for a different time, and the first counting information and the second counting information may be output on the left area and the right area, respectively.

In one exemplary embodiment disclosed herein, the mobile terminal may further include a cover configured to be coupled to the main body to be rotatable between a first state of being disposed to cover the front surface of the main body and a second state of being disposed in parallel to the front surface. The controller may output the counting information on the first area and deactivate the second area in the first state.

In one exemplary embodiment disclosed herein, the counting information may correspond to a remaining time to be counted for executing the control function, and the controller may reset the remaining time based on a touch point when a touch is applied to the second area while the counting information is output.

In one exemplary embodiment disclosed herein, the counting information may be changed according to a length of the reset remaining time.

In one exemplary embodiment disclosed herein, the controller may reset the predetermined time based on an applied input when a pinch-in or a pinch-out input is applied to the first area while the counting information is output.

In one exemplary embodiment disclosed herein, the second area may be disposed on the front surface of the main body, and the first area may extend from the second area and be disposed on side surfaces of the main body.

In one exemplary embodiment disclosed herein, the controller may execute the time counting in order to execute a sleep mode for deactivating the display unit, and deactivate the display unit when a user input has not been applied for the predetermined time.

In one exemplary embodiment disclosed herein, the mobile terminal may further include a camera. The display unit may output an image captured by the camera. The controller may execute the time counting for executing a self-timer, and capture an image caught on the camera after the lapse of the predetermined time.

In one exemplary embodiment disclosed herein, the time counting may be executed when a touch is applied to one point of an edge area of the display unit which outputs the image captured by the camera.

In one exemplary embodiment disclosed herein, the predetermined time may be set differently according to the touch-applied point.

In one exemplary embodiment disclosed herein, the controller may execute a first capturing after a lapse of a first time corresponding to a point where a first touch is applied and execute a second capturing after a lapse of a second time corresponding to a point where a second touch is applied when the first touch is applied to one side of the display unit and continuously the second touch is applied to another side of the display unit.

To achieve these and other advantages and in accordance with the purpose of this specification, as embodied and broadly described herein, there is provided a control method of a mobile terminal including displaying an execution screen in response to an activation of a function on at least one of first and second areas using a display unit, which includes the first area disposed on a front surface of a main body, and the second area extending from the first area and disposed on side surfaces of the main body, sensing a touch applied to the second area while the execution screen is displayed, executing time counting associated with the execution screen in response to the sensed touch and displaying counting information informing the progressing of the time counting on the second area, and processing the function associated with the execution screen when the time counting is completed.

Also, in accordance with one exemplary embodiment disclosed herein, there is provided a control method of a mobile terminal including executing time counting in association with a terminal operation, continuously displaying counting information on at least a part of an edge region of the display unit for a predetermined time so as to show the time counting, and executing a control function associated with the terminal operation when the predetermined time elapses.

In one exemplary embodiment disclosed herein, the continuous displaying of the counting information for the predetermined time may be configured to visually change the displayed counting information as the time is counted.

In one exemplary embodiment disclosed herein, the display unit may be divided into a first area for displaying the counting information, and a second area not displaying the counting information, and the first area may extend along at least one side of the display unit.

In one exemplary embodiment disclosed herein, the second area may be disposed on the front surface of the main body, and the first area may extend from the second area and be disposed on side surfaces of the main body.

In one exemplary embodiment disclosed herein, the counting information may correspond to a remaining time to be counted for executing the control function, and the controller may reset the remaining time based on a touch point when a touch is applied to the first area while the counting information is output.

In accordance with one exemplary embodiment disclosed herein, a mobile terminal may provide counting information related to time counting in a changing manner according to a lapse of time when the time counting is executed in association with a terminal operation. Therefore, a user may use a user interface which allows for briefly checking the time counting which is ongoing in the mobile terminal.

Also, in accordance with one exemplary embodiment disclosed herein, a mobile terminal may execute a control function after a lapse of a predetermined time, in response to a touch applied to an edge area of the display unit. That is, a time mode in which a function is executed after a predetermined time elapses may be executed by a simple touch operation. Therefore, the user may activate the time mode merely by touching one point of the edge of the display unit. Here, the activated control function may be changed according to an application which has been run just before the touch is applied.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

Figure 12A:
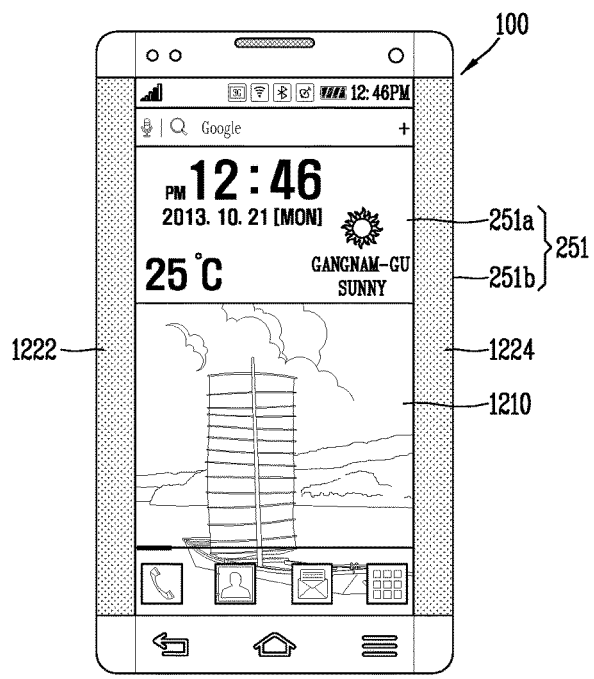
Figure 12B:
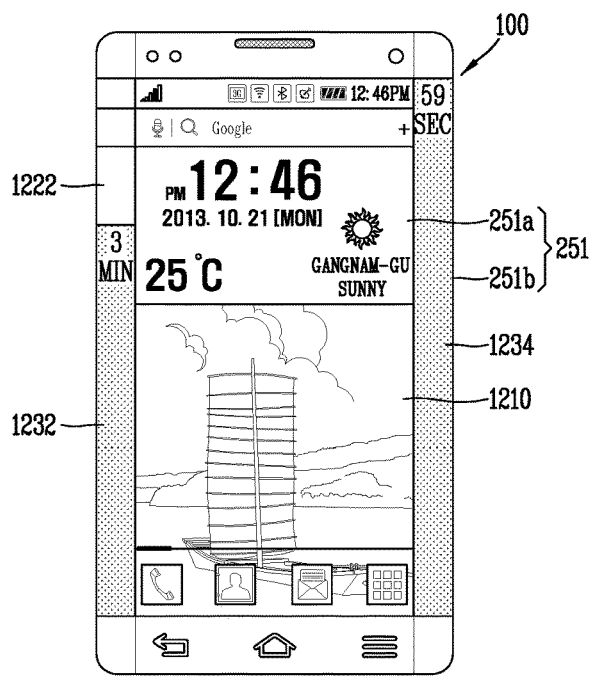
Figure 12C:
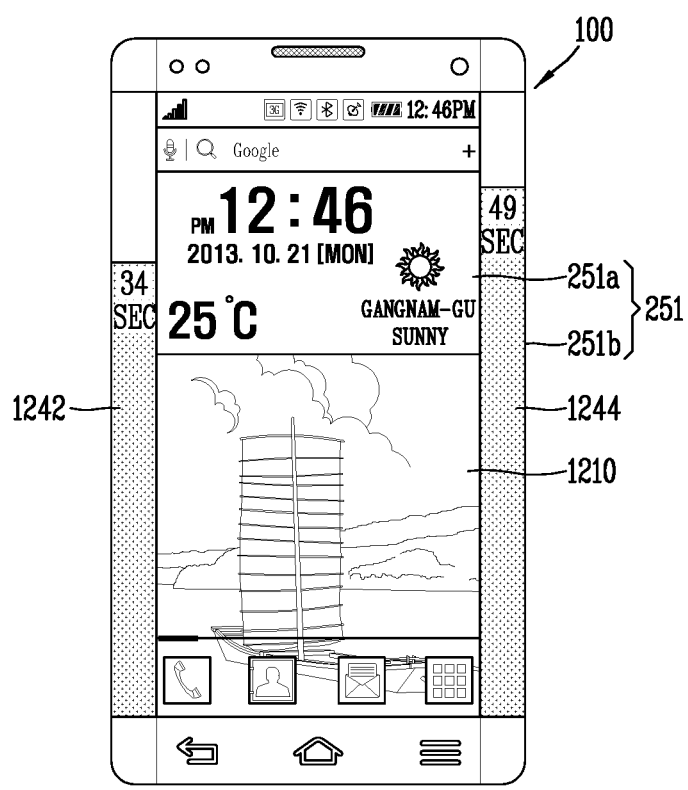
Figure 15:
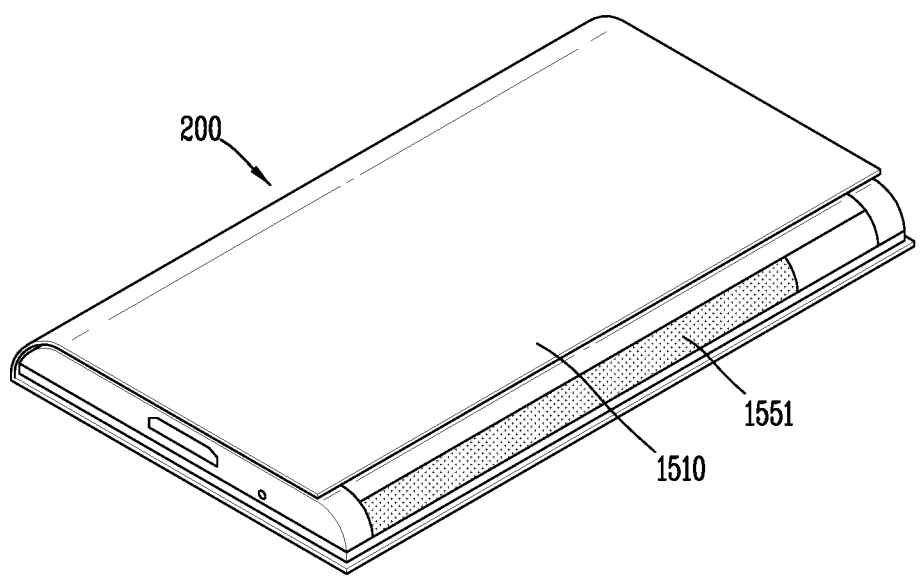
Figure 16A:
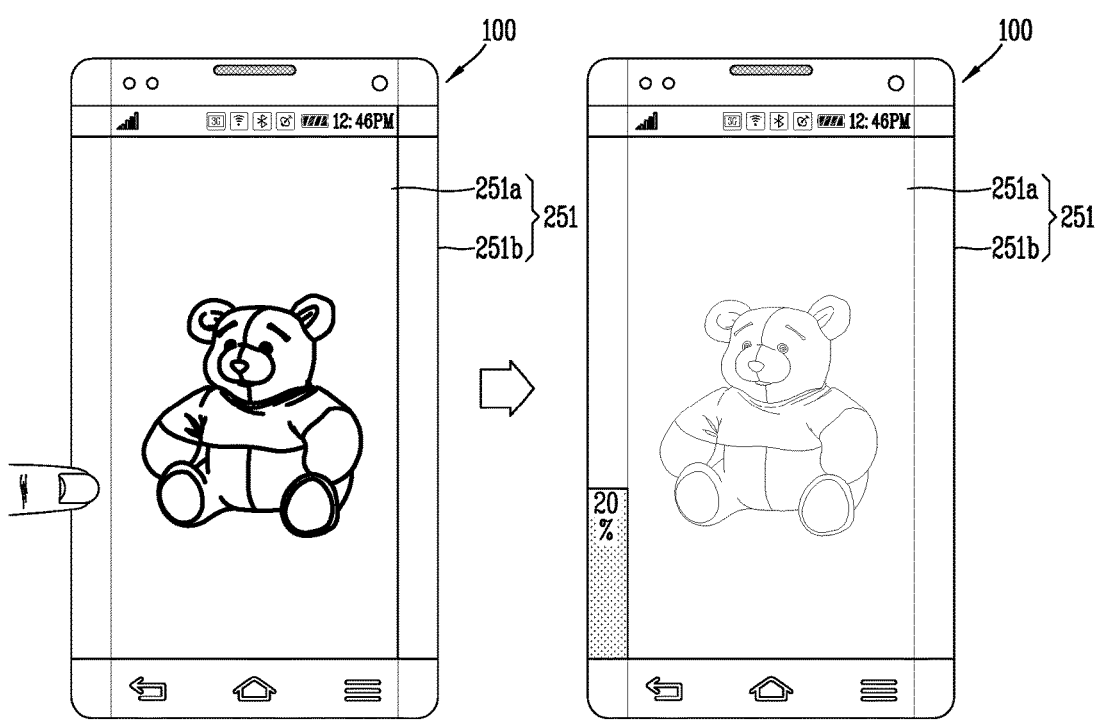
Figure 16B:
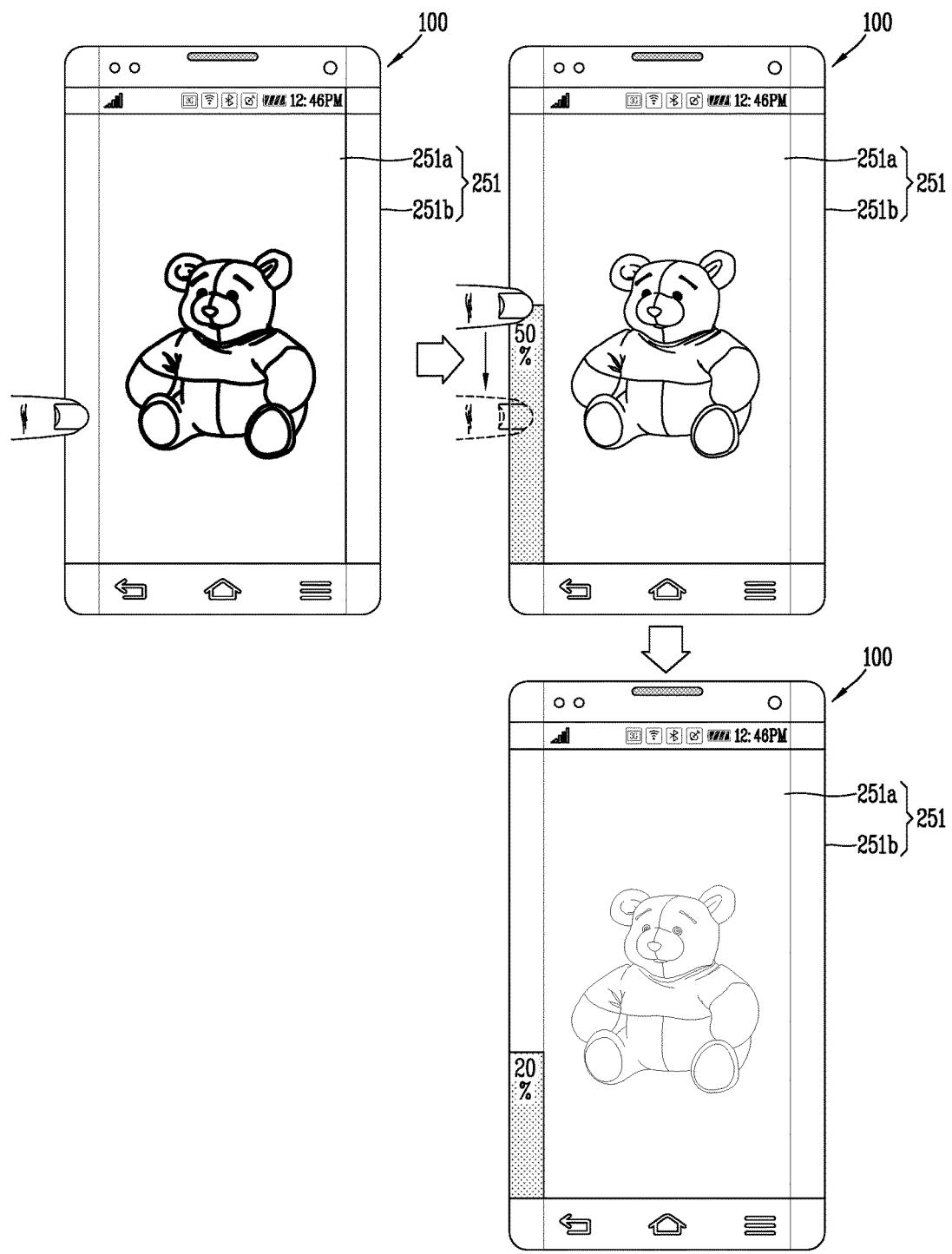
Figure 16C:
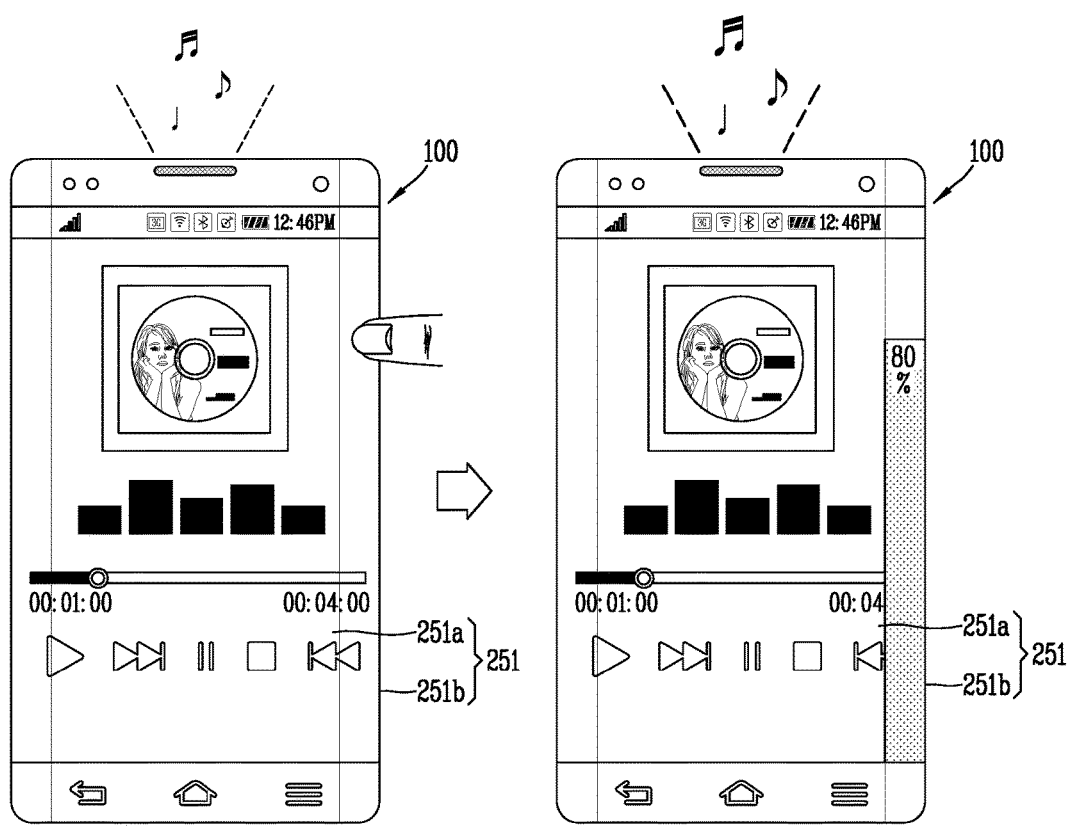

to FIG. 11 is a view illustrating a method of setting a time as a criterion of time counting based on a user input in a mobile terminal in accordance with one exemplary embodiment disclosed herein;

FIGS. 12A, 12B and 12C are views illustrating a method of displaying a plurality of counting information in a mobile terminal in accordance with one exemplary embodiment disclosed herein;

FIGS. 13A, 13B, 14A and 14B are views illustrating a method of changing counting information in a mobile terminal in accordance with one exemplary embodiment disclosed herein;

FIG. 15 is a view illustrating a method of outputting counting information in a mobile terminal, which has a display unit partially bent, in accordance with one exemplary embodiment disclosed herein; and FIGS. 16A, 16B and 16C are views illustrating a method of changing a set value related to an execution screen based upon a user input in a mobile terminal in accordance with one exemplary embodiment disclosed herein.

DETAILED DESCRIPTION OF THE DISCLOSURE

Hereinafter, preferred embodiments of the present invention will be described in detail with reference to the accompanying drawings, and the same or similar elements are designated with the same numeral references regardless of the numerals in the drawings and their redundant description will be omitted. In addition, a suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators, slate PCs, tablet PCs, ultrabooks, and the like, and stationary terminals, such as digital TVs, desktop computers and the like. However, it can be easily understood by those skilled in the art that the configuration according to the following description can be applied to the stationary terminals except for components particularly provided for mobility.

Figure 1:
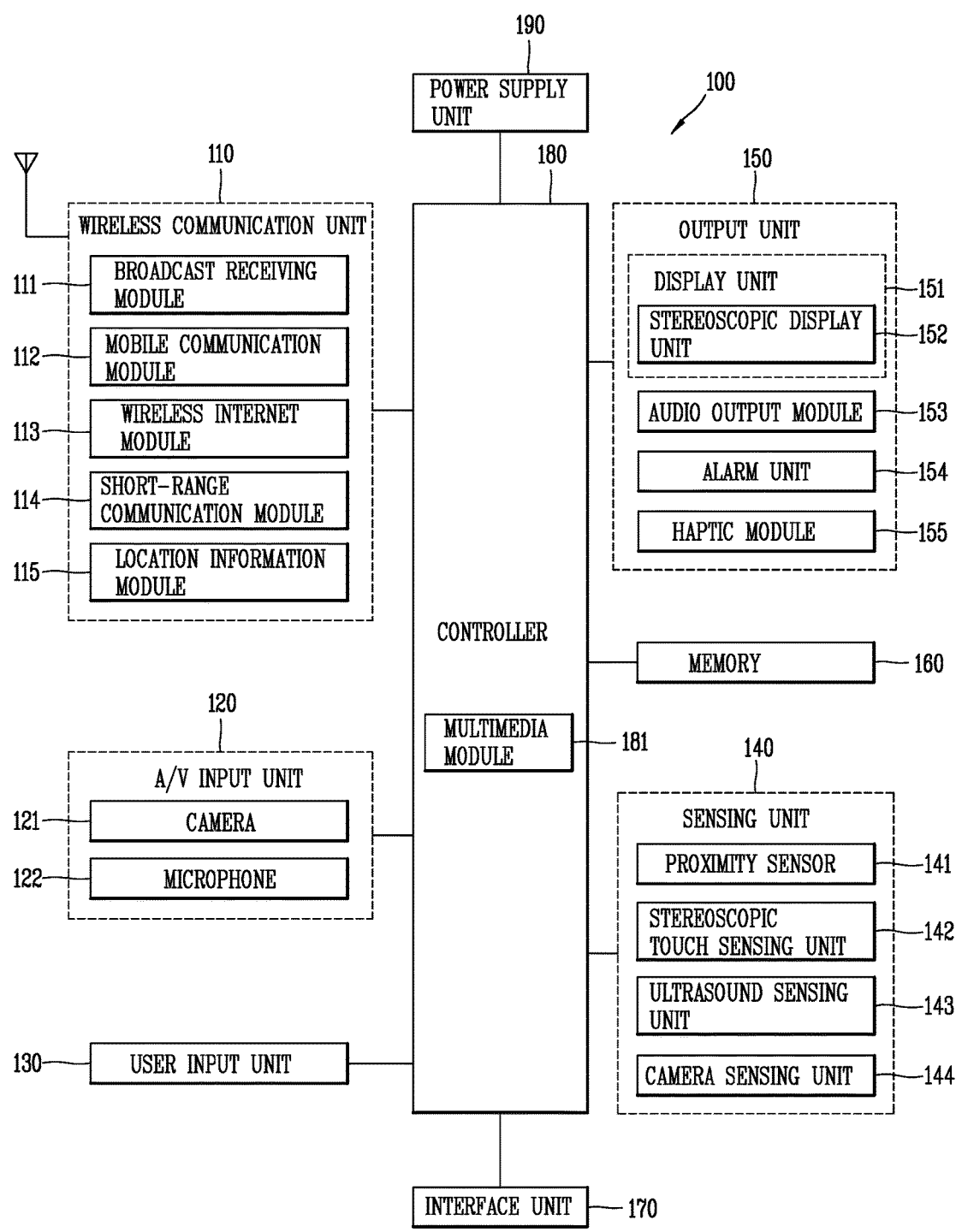
FIG. 1 is a block diagram of a mobile terminal in accordance with one exemplary embodiment disclosed herein.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the A/V input unit 120 may be configured to provide an audio or video signal input to the mobile terminal. The A/V input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image. Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the mobile terminal 100. The audio output module 153 may include a receiver, a speaker, a buzzer or the like.

The alarm unit 154 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects the that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
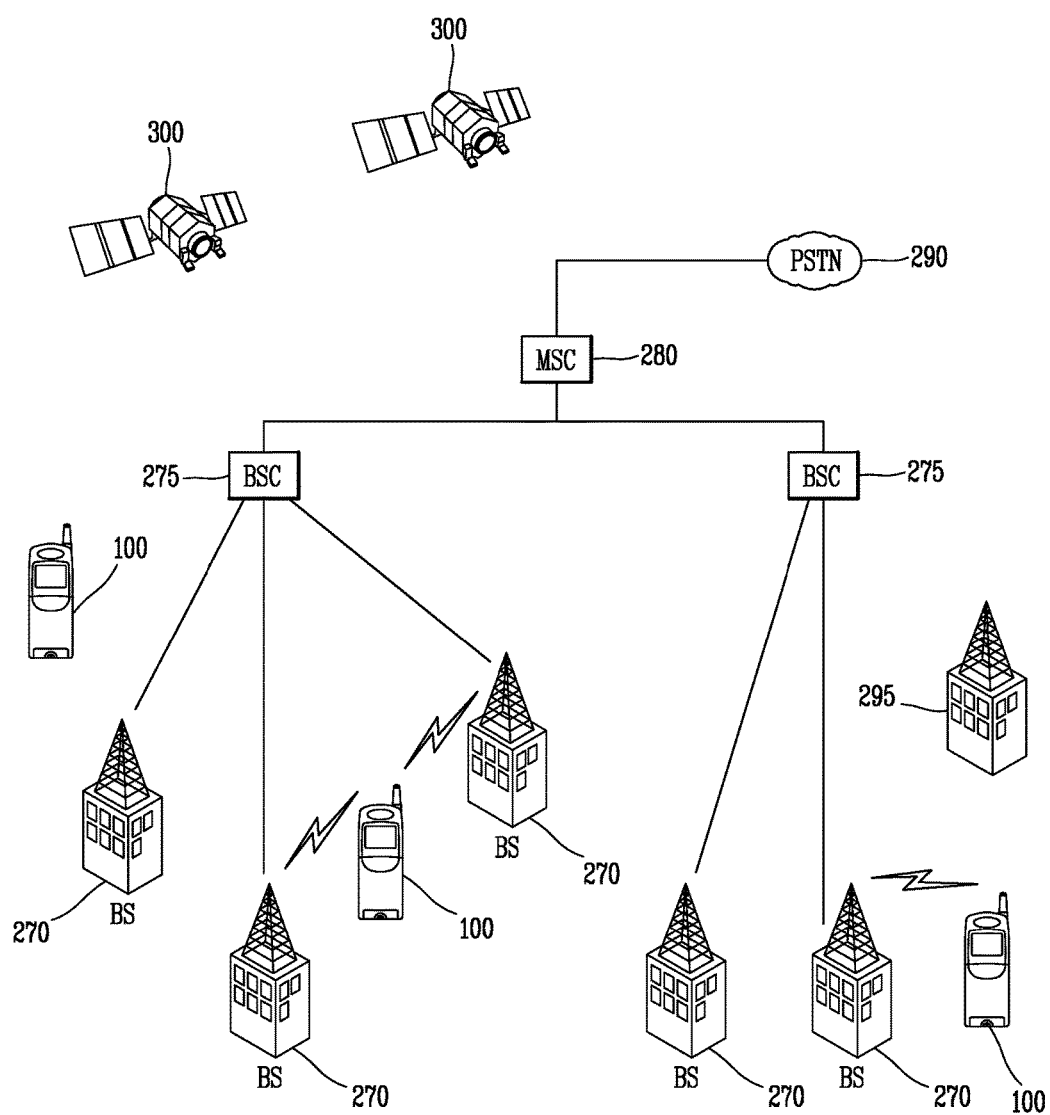
FIGS. 2A and 2B are conceptual views of a communication system operable with the mobile terminal in accordance with the one exemplary embodiment.
Figure 2B:
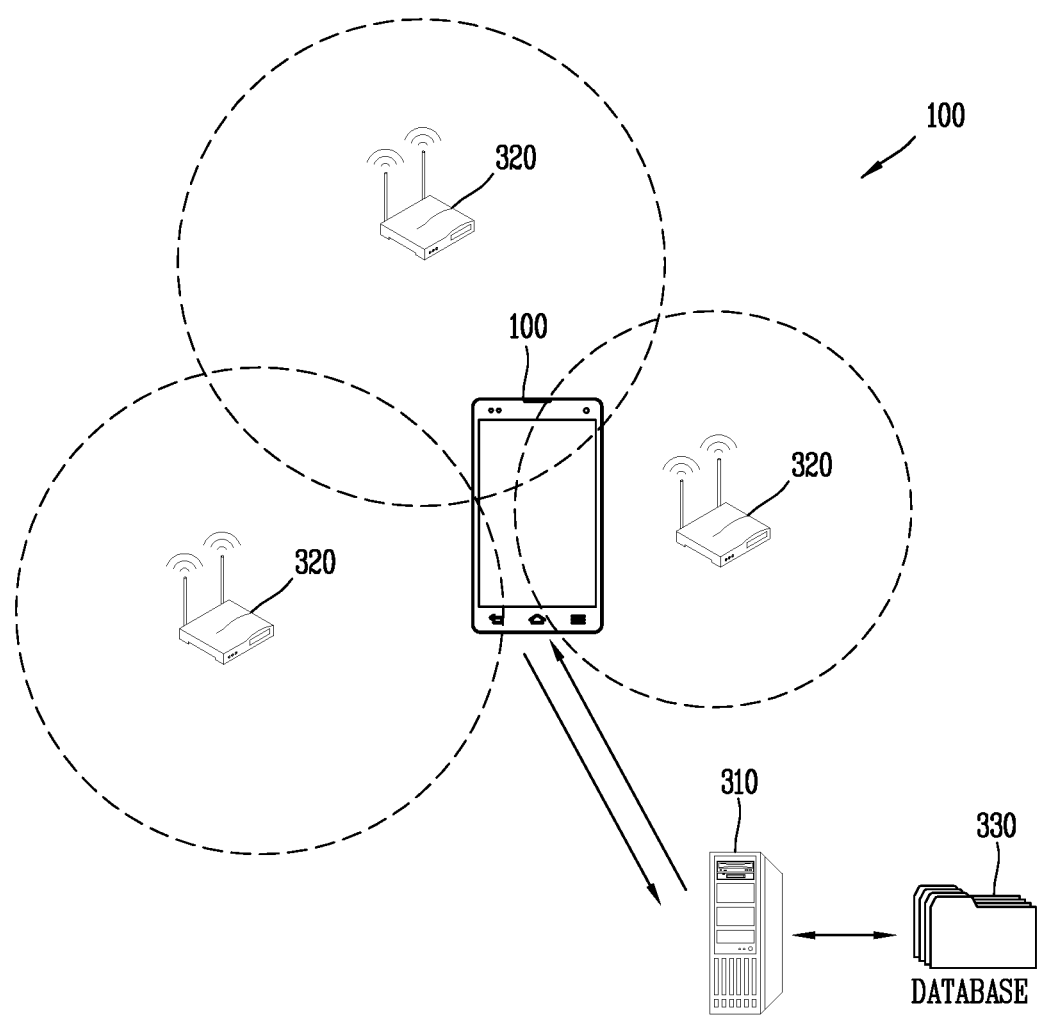

Hereinafter, a communication system which is operable with the mobile terminal 100 according to the present disclosure will be described. FIGS. 2A and 2B are conceptual views of a communication system operable with a mobile terminal 100 in accordance with the present disclosure.

First, referring to FIG. 2A, such communication systems may utilize different air interfaces and/or physical layers. Examples of such air interfaces utilized by the communication systems may include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings may be applied equally to other system types including the CDMA wireless communication system.

Referring now to FIG. 2A, a CDMA wireless communication system is shown having a plurality of mobile terminals 100, a plurality of base stations (BSs) 270, a plurality of base station controllers (BSCs) 275, and a mobile switching center (MSC) 280. The MSC 280 may be configured to interface with a conventional Public Switch Telephone Network (PSTN) 290. The MSC 280 may also be configured to interface with the BSCs 275. The BSCs 275 may be coupled to the BSs 270 as a pair via backhaul lines. The backhaul lines may be configured in accordance with at least one of several known interfaces including, for example, E1/T1, ATM, IP, PPP, Frame Relay, HDSL, ADSL, or xDSL. Hence, the plurality of BSCs 275 may be included in the system as illustrated in FIG. 2A.

Each BS 270 may include one or more sectors, each sector having an omni-directional antenna or an antenna pointed in a particular direction radially away from the BS 270. Alternatively, each sector may include two or more different antennas. Each BS 270 may be configured to support a plurality of frequency assignments, with each frequency assignment having a particular spectrum (for example, 1.25 MHz, 5 MHz, etc.).

The intersection of sector and frequency assignment may be referred to as a CDMA channel. The BSs 270 may also be referred to as Base Station Transceiver Subsystems (BTSs). In some cases, the term "base station" may be used to refer collectively to one BSC 275 and at least one base station 270. The base stations may also be denoted as "cell sites." Alternatively, individual sectors of a given BS 270 may be referred to as cell sites.

A broadcasting transmitter (BT) 295, as illustrated in FIG. 2A, may transmit a broadcast signal to the mobile terminals 100 operating within the system. The broadcast receiving module 111 illustrated in FIG. 1 may be typically configured inside the mobile terminal 100 to receive broadcast signals transmitted by the BT 295.

FIG. 2A further depicts several Global Positioning System (GPS) satellites 300. Such satellites 300 may facilitate locating the position of at least one of plural mobile terminals 100. Two satellites are depicted in FIG. 2, but it may be understood that useful position information may be obtained with greater or fewer satellites than two satellites. The GPS module 115 illustrated in FIG. 1 may be typically configured to cooperate with the satellites 300 to obtain desired position information. It may be appreciated that other types of position detection technologies, in addition to or instead of GPS location technology, may alternatively be implemented. If desired, at least one of the GPS satellites 300 may alternatively or additionally be configured to provide satellite DMB transmissions.

During typical operation of the wireless communication system, the BSs 270 may receive sets of reverse-link signals from various mobile terminals 100. The mobile terminals 100 may be engaging in calls, messaging, and executing other communications. Each reverse-link signal received by a given BS 270 may be processed within that BS 270. The resulting data may be forwarded to a connected BSC 275. The BSC 275 may provide call resource allocation and mobility management functionality including the orchestration of soft handoffs between BSs 270. The BSCs 275 may also route the received data to the MSC 280, which may then provide additional routing services for interfacing with the PSTN 290. Similarly, the PSTN 290 may interface with the MSC 280, and the MSC 280 may interface with the BSCs 275, which may in turn control the BSs 270 to transmit sets of forward-link signals to the mobile terminals 100.

Hereinafter, description will be given of a method for acquiring location information of a mobile terminal using a Wireless Fidelity (WiFi) Positioning System (WPS), with reference to FIG. 2B.

The WiFi positioning system (WPS) 300 refers to a positioning technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 may extract the information about the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 2B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as a MAC address, SSID, RSSI, channel information, a privacy, a network type, latitude and longitude coordinates of the wireless AP, a building at which the wireless AP is located, a floor number, detailed indoor location information (GPS coordinates available), an AP owner's address, a phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched with the retrieved wireless AP, thereby extracting location information related to the mobile terminal 100.

Hereinafter, a hardware configuration of the mobile terminal which executes such operations of FIG. 2 will be described in more detail.

Figure 3A:
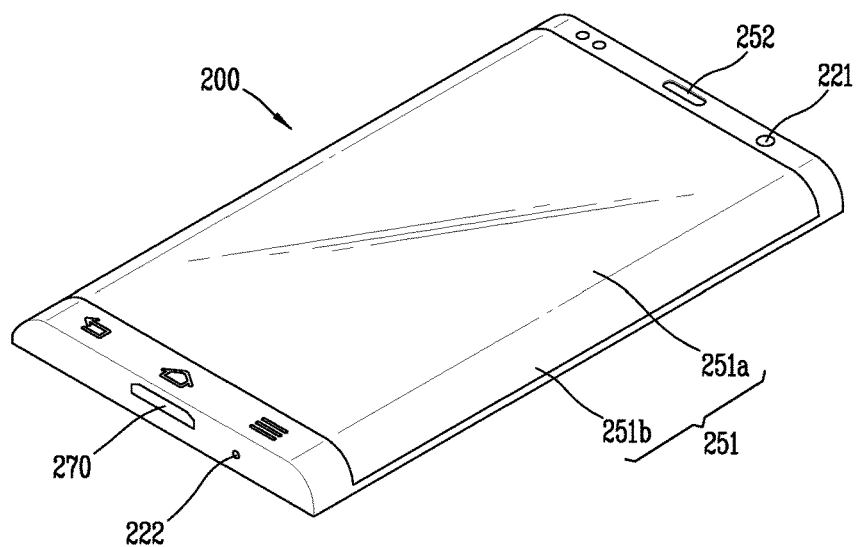
FIG. 3A is a front perspective view of one example of a mobile terminal in accordance with the present disclosure.
Figure 3B:
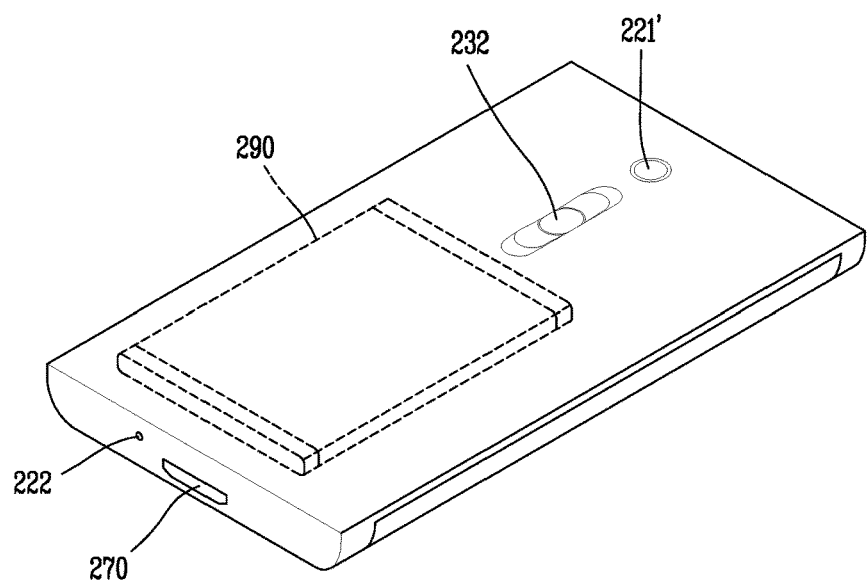
FIG. 3B is a rear perspective view of the mobile terminal illustrated in FIG. 3A.

FIG. 3A is a front perspective view of one example of a mobile terminal 200 in accordance with the present disclosure, and FIG. 3B is a rear perspective view of the mobile terminal 200 illustrated in FIG. 3A.

A mobile terminal 200 disclosed herein may be provided with a mobile phone body of a banded display only phone (DOP) type which has a display unit 251 extending up to side surfaces of a terminal main body.

A body may include a case (or referred to as casing, housing, cover, etc.) defining an appearance of the mobile terminal 200. In this exemplary embodiment, the case may be divided into a front case 201 and a rear case 202. A space formed between the front and rear cases 201 and 202 may accommodate various electronic components. At least one intermediate case may further be disposed between the front and the rear cases 201 and 202.

Such cases may be injected using a synthetic resin or be formed of a metal, such as stainless steel (STS), titanium (Ti) or the like.

The terminal body is shown having a display unit 251, an audio output module 252, a camera 221 and the like provided generally on the front case 201. Also, an interface unit 270, and the like may be disposed on side surfaces of the front case 201 and the rear case 202.

The display unit 251 may occupy most of a principal surface of the front case 201. That is, the display unit 251 may be disposed on a front surface of the terminal, and display visual information. The display unit 251 disclosed herein may have a shape extending up to another surface of the terminal in addition to the front surface of the terminal. In more detail, the display unit 251 may include a first area 251a located on the front surface and a second area 251b extending from the first area 251a and disposed on side surfaces of the main body.

For example, a window disposed on an upper surface of the display unit 251 may have both side surfaces bent, and accordingly an appearance of the front surface and the side surfaces of the main body may be formed by the window. Hence, the first area 251a and the second area 251b may be connected to each other without a physical boundary. In this case, the display unit 251 may be provided with a display device which is formed in a bent shape and mounted to correspond to the window.

In addition, the display unit 251 may be formed in such a manner that an upper end or a lower end is bent. That is, at least one of an upper end, a lower end, a left end, and a right end of the display unit 251 may be bent to be disposed on the side surfaces of the main body.

As another example, the display unit 251 may be configured as a flexible display unit. The flexible display unit may include a display, which can be bent, curved, twisted, folded, rolled by an external physical force. Here, the flexible display unit may include both a general flexible display and an e-paper.

Here, the general flexible display denotes a light, non-fragile display, which still exhibits characteristics of the conventional flat panel display and is fabricated on a flexible substrate which can be curved, bent, folded, or rolled.

Also, the e-paper is a display technology employing the characteristic of a general ink, and is different from the conventional flat panel display in view of using reflected light. The e-paper may change pictures or characters by using a twist ball or an electrophoresis using a capsule.

In this manner, the terminal main body, which is provided with a display unit having both side surfaces bent due to the characteristic of a flexible material, may be configured.

An audio output module 252 and a camera module 221 may be disposed on an area adjacent to one of both end portions of the display unit 251, and a front input unit (not illustrated) and a microphone 222 may be disposed on an area adjacent to the other end portion.

A front input unit is an example of a user input unit 130 (see FIG. 1), and may include a plurality of manipulating units. The manipulating units may be referred to as a manipulating portion, and various methods and techniques can be employed for the manipulation portion so long as they can be operated by the user in a tactile manner.

The display unit 251 may also form a touch screen together with a touch sensor, and in this case, the touch screen may be the user input unit 130. This may allow for a configuration without a front input unit on the front surface of the terminal. For this, the mobile terminal may allow an input with respect to the main body to be manipulated only through the display unit 251.

Referring to FIG. 3B, a camera module 221' may additionally be disposed on the rear surface of the terminal body, namely, on the rear case 202. The camera module 221' may have an image capture direction which is substantially opposite to that of the camera module 221 (See FIG. 2A), and have a different number of pixels than the camera module 221.

For example, the camera module 221 may have a smaller number of pixels to capture an image of the user's face and transmit such image to another party, and the camera module 221' may have a larger number of pixels to capture an image of a general object and not immediately transmit it in most cases. The camera modules 221 and 221' may be installed on the terminal body such that they can be rotatable or popped up.

A flash and a mirror may be additionally disposed adjacent to the camera 221'. When an image of a subject is captured with the camera module 221', the flash illuminates the subject. The mirror allows the user to see himself when he wants to capture his own image (i.e., self-image capturing) by using the camera module 221'.

An audio output unit 252' may be additionally disposed on the rear surface of the terminal body. The audio output module 252' on the rear surface may implement stereophonic sound functions in conjunction with the audio output module 252 (See FIG. 3A) and may be also used for implementing a speaker phone mode for call communication.

That is, the audio output module 252 (or a first audio output module) on the front surface of the terminal may be configured as a receiver, and the audio output module 252' (or a second audio output module) on the rear surface may be configured as a speaker. However, the present disclosure may not be limited to this. The second audio output module 252' may also be disposed on a side surface of the terminal.

A power supply unit 290 for supplying power to the mobile terminal 200 is mounted on the terminal body. The power supply unit 290 may be installed within the terminal body or may be directly attached to or detached from the exterior of the terminal body.

As illustrated, a rear input unit 232 may be disposed on the rear surface of the terminal body. The rear input unit 232, for example, may be located below the camera module 221'.

The rear input unit 232 may be manipulated for allowing an input of a command for controlling an operation of the mobile terminal 200. Content inputted can be variably set. For example, the rear input unit 232 may receive a command such as starting, ending, scrolling, etc., a command such as controlling of the volume of a sound outputted from the audio output unit 252, or conversion into a touch recognition mode of the display unit 251. However, the present disclosure may not be limited to this. The terminal may also be provided with only one of the front input unit and the rear input unit 232.

Explaining the display unit 151 again, the display unit 151 disclosed herein may be formed to occupy even the side surfaces as well as the front surface of the terminal, so as to implement a larger screen. That is, the present disclosure may provide a terminal having a front display and a side display, so as to provide a new type of user interface using them. Hereinafter, description will be given in more detail of the front display, the side display and operations implemented thereby, with reference to the accompanying drawings.

Also, a mobile terminal according to one exemplary embodiment including at least one of the aforementioned components may execute time counting in association with an operation of the terminal, and continuously output counting information on at least part of an edge area of a display unit 151 to show (guide or notify) the time counting for a predetermined time. That is, when the time counting for the operation of the terminal is started, the counting information may be displayed on the edge area of the display unit 151. When the predetermined time elapses, a control function related to the operation of the terminal may be activated. Therefore, a user can intuitively recognize a time for executing the control function based on the counting information displayed on the edge area.

Hereinafter, description will be given in detail of a mobile terminal, which outputs counting information in response to a start of time counting, and a control method thereof, with reference to the accompanying drawings. The same or similar elements in the exemplary embodiments disclosed herein are designated with the same numeral references regardless of the numerals in the drawings and their redundant description will be omitted.

Figure 4:
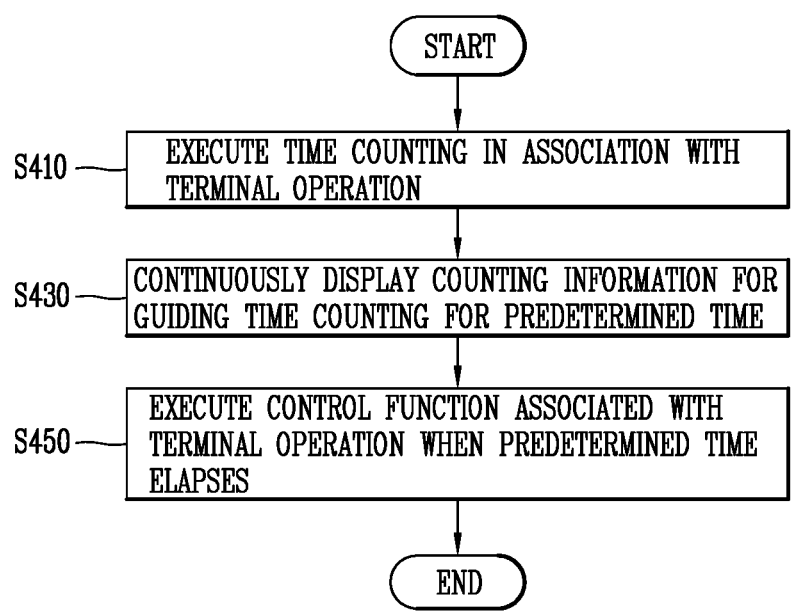
FIG. 4 is a flowchart illustrating a control method for a mobile terminal in accordance with one exemplary embodiment disclosed herein.

FIG. 4 is a flowchart illustrating a control method for a mobile terminal in accordance with one exemplary embodiment disclosed herein.

As illustrated in FIG. 4, in a mobile terminal according to the present disclosure, time counting associated with an operation of the terminal may be started (S410).

Here, the time counting refers to counting of a time from a specific time point in the mobile terminal. In more detail, the time counting refers to an operation that the controller 180 sets a start time point for starting the counting and counts a time for a predetermined time, starting from the set start time point. The time counting may be understood as an operation for executing a control function associated with the time counting after a lapse of the predetermined time.

Meanwhile, the start time point which is a criterion of the time counting may be set differently according to a control function to be activated, and decided by a condition which is differently set according to the control function. For example, when it is required to execute a sleep mode for deactivating the display unit 151, the controller 180 may set a time point, at which the last user input has been applied, as a start time point. In another example, when an alarm application for setting an alarm is executed, a time point at which a user input for setting the alarm is applied may be set as the start time point.

A unit of time counted may be changed variously according to a control function, and man be, for example, 1 second, 1 minute, 1 hour and the like. The time counting may be carried out on the second basis or the minute basis. The unit may be changed according to the control function. In addition, the unit of the time counted may be changed by a user input.

Next, when the time counting is executed in the terminal, counting information for showing the time counting may be continuously displayed for a predetermined time (S430).

That is, the controller 180 may output counting information related to a counted time on the display unit 251 as soon as the time counting being executed.

In the mobile terminal 100 according to the one exemplary embodiment, the display unit 251 (see FIG. 3) may include the first area 251*a* (see FIG. 3) disposed on the front surface of the terminal main body, and the second area 251*b* (see FIG. 3) extending from the first area 251*a* and disposed on side surfaces of the main body. The first area 251*a* and the second area 251*b* may be areas displaying different types of information, and divided in response to each having a different type of user graphic interface (GUI). Or, the second area 251*b* may refer to a portion which starts to be bent toward the side surfaces from a virtual flat surface formed by the first area 251*a*, and the first and second areas 251*a* and 251*b* may be divided based on the virtual flat surface.

Also, the second area 251*b* may include a left area and a right area located on left and right side surfaces of the terminal, respectively. Therefore, the second area 251*b* may have a left-right symmetric structure based on the first area 251*a*.

Here, the counting information may be displayed on the second area 251*b*. That is, the counting information may be displayed on at least one of the left area and the right area of the second area 251*b*.

Meanwhile, the counting information may refer to information indicating that the time counting is in an activated state in the terminal. In more detail, the counting information may be visually changed as the time is counted. The counting information may include at least one of a predetermined time which is a criterion of the time counting (or a reference time to be counted for executing a control function), a start time point and an end time point corresponding to the predetermined time, a counted time from the start time point, and/or a remaining time which remains uncounted. For example, when the predetermined time to be counted is 1 minute and the counted time is 10 seconds, the remaining time may be 50 seconds. The counting information may refer to every information which is provided to show (guide) the time counting, and may be implemented in various forms according to exemplary embodiments.

The counting information may be varied according to a length of a time which is counted. An image whose size is gradually changed as a time is counted may be generated on the second area 251*b*, and the counting information may be displayed within the image. For example, the image may be a progress bar which indicates a progressing state of the time counting, and the progress bar may be varied according to a length of the time which is counted. In a more detailed example, the image may be provided with an effect that a paper or the like is rolled as a time elapses. And, the counting information may be displayed within the image.

Here, the image may be a bar-type image which is long along the side surface of the terminal, and different images may be employed according to types of functions for which the time counting is executed. In one example, a different image may be output according to a type of a function or according to a length of a time which is counted. Here, the different image may refer to an image with a different shape, length, color or the like.

In the meantime, the controller 180 may output guide information related to a control function, which is to be executed after the lapse of the predetermined time, on the display unit 251 together with the counting information. The guide information may include a name of the control function to be executed, detailed description of the control function, and the like. For example, when the time counting is started for deactivating the display unit 251, visual information which is implemented in a form of image, text, icon and the like for showing the deactivation of the display unit 251 implemented may be output together with the time which is counted.

After the lapse of the predetermined time, the control function associated with the operation of the terminal may be executed (S450). The controller 180 may count a predetermined time which is differently set according to a control function, and execute the control function associated with the operation of the terminal when the counted time reaches the predetermined time.

Here, the control function may refer to at least one of functions which are executable in the terminal. That is, the control function may be every type of function which can be executed or activated in the mobile terminal. For example, one of the executable functions may be an application installed in the mobile terminal. The term 'executing an arbitrary function' may refer to 'executing or activating an arbitrary application.'

The application is a conception including a widget or a home launcher, and refers to every type of program executable in the terminal. Therefore, the application may be a program which executes a function, such as a web browser, a video playback, a message transmission and reception, a schedule management, an application update, or the like.

In another example, the executable function in the mobile terminal may be a function of generating an event. Here, the generated event may be a message transmission event, a call-placing event, a capturing event, and the like. On the other hand, the event may be an event generated from an application installed in the mobile terminal.

In another example, the executable function in the mobile terminal may be a function which is required for a basic operation of the mobile terminal. The function required for the basic operation may be a turn on/off of a lighting disposed in the display unit 151, a conversion of the mobile terminal from an unlock state into a lock state or vice versa, setting of a communication network, changing of setting information related to the mobile terminal, and the like.

As such, according to the present disclosure, the controller 180 may output the counting information on the side display when the time counting is executed, and activate at least one control function of the aforementioned functions after the lapse of the predetermined time.

Figure 5:
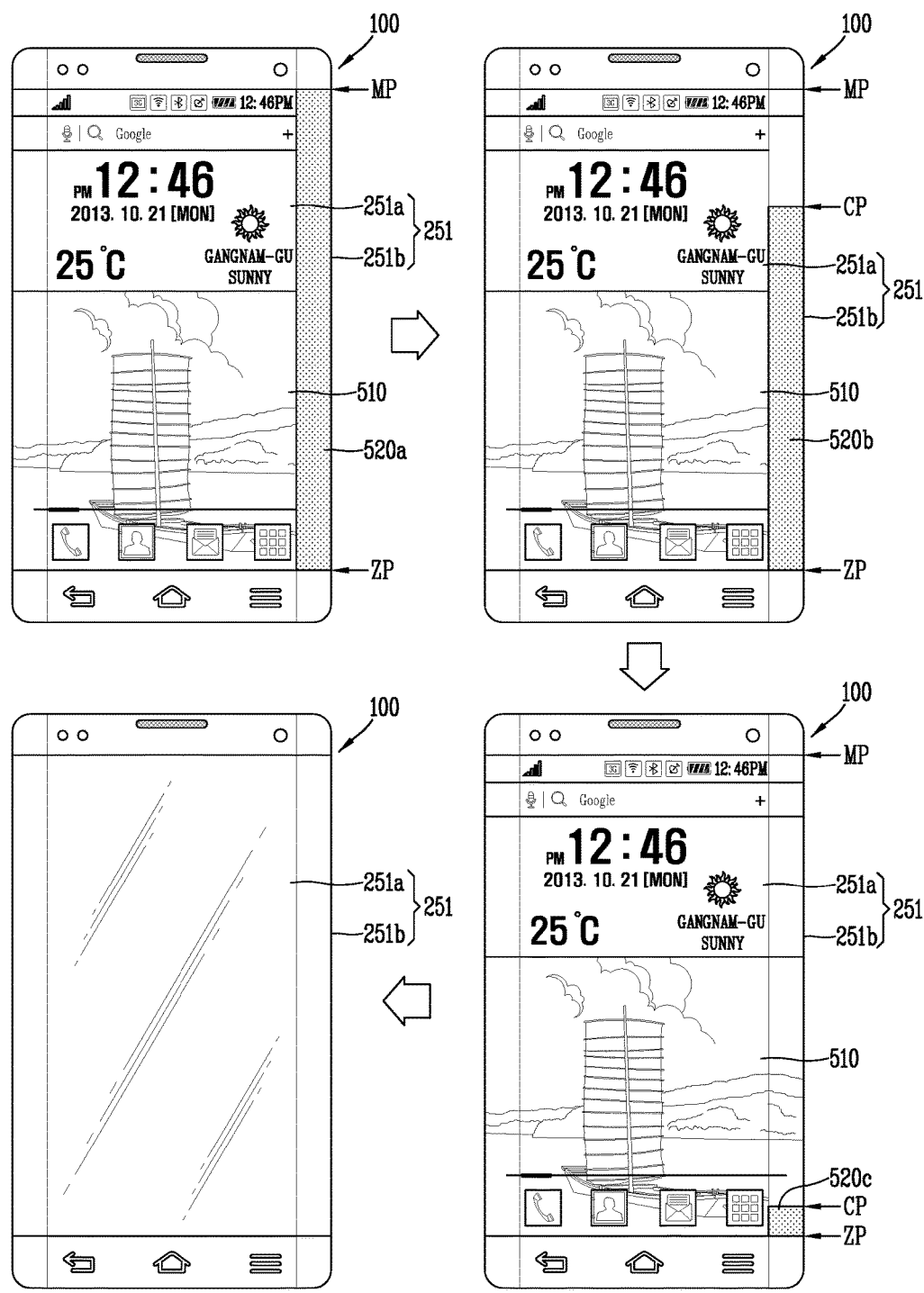
FIG. 5 is a conceptual view illustrating the control method of FIG. 4.
Figure 6:
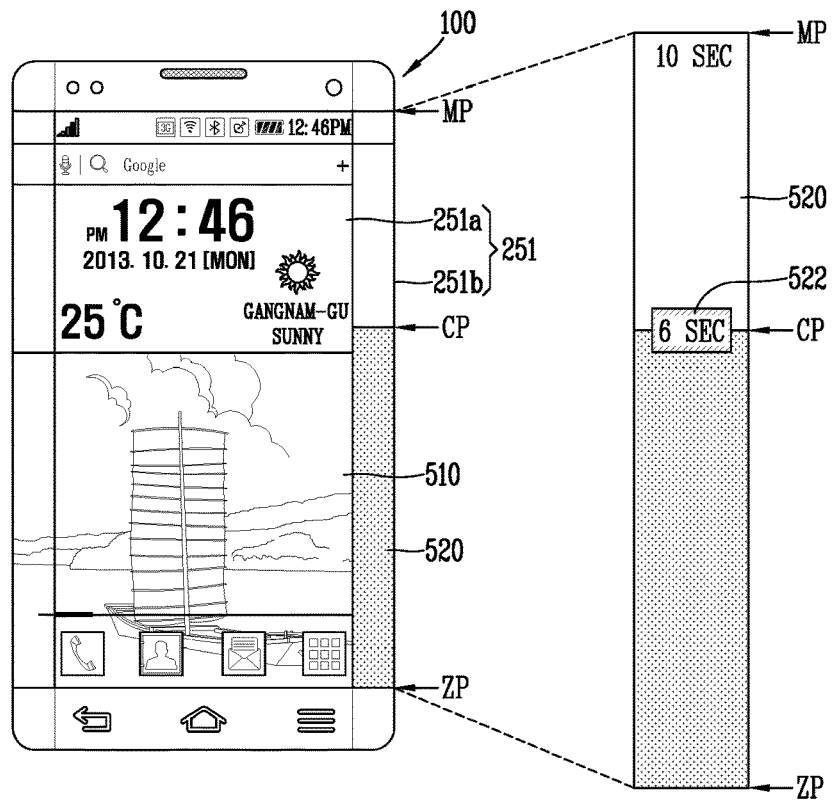
FIG. 6 is a view illustrating a method of displaying counting information in a mobile terminal in accordance with one exemplary embodiment disclosed herein.

Hereinafter, description will be given in more detail of the method of controlling the mobile terminal according to the control method illustrated in FIG. 4. FIG. 5 is a conceptual view illustrating the control method of FIG. 4, and FIG. 6 is a view illustrating a method of displaying counting information in a mobile terminal in accordance with one exemplary embodiment disclosed herein.

As illustrated in FIG. 5, a home screen page may be output on the display unit 251 of the mobile terminal 200. At least one object may be included in the home screen page. The object may be an icon of an application installed in the mobile terminal or a widget. The home screen page may be output on an overall area of the first area 251*a* and the second area 251*b*. In addition to the home screen page, the display unit 251 may output screen information 510, such as an execution screen corresponding to one or more functions, an idle screen, a lock screen or the like.

Still referring to FIG. 5, in the mobile terminal disclosed herein, when a control command has not been applied for a predetermined time while the home screen page is displayed, a lighting of the display unit 251 may be turned off.

This condition may be represented as 'the display unit 251 has been lighted off due to time-out' or 'a sleep mode has started (been executed).'

For executing the sleep mode, the controller 180 may execute the time counting while the screen information 510 is output on the display unit 251. When the time counting is started, counting information 520a to 520c may be output on the second area 251b.

The time counting for executing the sleep mode may be executed when a preset condition is met. The preset condition may be associated with at least one of a state of the terminal, an executed application, and a user input. For example, the controller 180 may start the time counting for deactivating the display unit 151 when the user input has not been applied for the predetermined time while the display unit 151 is activated. That is, to execute the sleep mode, the time counting may be started from a time point at which the last user input has been applied.

In addition, when the user input is applied before the predetermined time elapses, the controller 180 may reset the time counting which is ongoing at the time point that the new user input is applied, and execute new time counting.

An exemplary embodiment that the time counting is executed in response to the user input will be explained later with reference to FIG. 7.

Meanwhile, when the time counting is executed, the controller 180 may divide the display unit 251 into the first area 251a and the second area 251b, and output counting information on the second area 251b. And, screen information which has been most recently output on the display unit 251 before the start of the time counting may be displayed on the first area 251a.

In response to the execution of the time counting, the screen information which has been output on the entire area of the display unit 251 may be output on the entire area or be reduced to be output on the first area 251a. When the screen information is output on the entire area, it may be output in a manner of overlapping the counting information output on the second area 251b. On the other hand, when the screen information is reduced, a content included in the screen information may be changed in size according to the size of the first area 251a or a content output on the display unit 251 may be changed.

Meanwhile, the controller 180 may output counting information, which gradually changes as a time elapses, on the second area 251b. That is, the controller 180 may visually change the counting information such that a counted time (or a remaining time without being counted) can be displayed according to the lapse of the time.

Here, the second area 251b may serve as an axis using a time as a variable such that the gradually-changed counting information can be displayed. That is, a lower end of the second area 251b may correspond to a zero point (hereinafter, referred to as 'ZP') at which a control function is executed, and an upper end of the second area 251b may correspond to a max point (hereinafter, referred to as 'MP') of a time to be counted. The second area 251b may be divided on the unit time basis. For example, when the max point MP corresponds to 60 seconds and the unit time is one second, the second area 251b may be divided into 60 sections from the lower end to the upper end.

In a continuous manner, the controller 180 may calculate a current point CP where the counted time (or the remaining time) is displayed as the counting is progressing, and display the counting information using the calculated current point CP. In the aforementioned example, when the remaining time is 10 seconds, a $10^{th}$ section from the lower end of the second area 251b may be calculated as the current point CP.

For example, referring to FIG. 6, counting information 520 may include information related to an overall execution time of the time counting, namely, a predetermined time (for example, '10 seconds') which is counted for executing a control function. The predetermined time may match the overall section from the max point MP to the zero point ZP. A graphic object 522 indicating the counted time (or the remaining time without being counted) may be displayed on the current point CP of the counting information 520. According to the lapse of time, the counting information 520 output on the display unit 151 may be changed or an output position of the graphic object 522 may be changed.

When a bar-type image formed long along the side surface of the terminal is displayed on the second area 251b, one end of the image may be located on the current point CP, and moved toward the zero point ZP according to the lapse of time.

Meanwhile, the image, the zero point ZP, the max point MP, the current point CP, and the graphic object 522 displayed on the current point CP, which are related to the counting information, may be changed in various manners according to embodiments.

Referring back to FIG. 5, when the current point CP displaying the counted time thereat reaches the zero point ZP (namely, reaching the predetermined time (or the predetermined time is fully counted), the controller 180 may execute a control function for which the time counting has been executed. For example, the controller 180 may deactivate the display unit 251 when a user input has not been applied for the predetermined time while the counting information is displayed in the activated state of the display unit 251.

In such a manner, the controller 180 may continuously display the counting information, which is changed according to the lapse of time, for the predetermined time, and after the predetermined time, convert the display unit 251 into the deactivated state. That is, the controller 180 may light off the display unit 251 when the time counting arrives at the last point (section).

As aforementioned, in the mobile terminal disclosed herein, when the time counting is executed in the terminal, the counting information for guiding the time counting may be displayed on the second area 251b for the predetermined time. When the predetermined time elapses, the control function associated with the time counting may be executed. The counting information may be information that the user can typically ideally recognize. Accordingly, the controller 180 may provide a more familiar user experience (UX) to the user. That is, the mobile terminal according to the present disclosure may provide the user with a user interface environment which is more intuitive and relatively simple.

Meanwhile, the time counting may be executed by a user input. Hereinafter, description will be given in detail of a method of executing time counting according to a user input, with reference to FIG. 7.

Figure 7:
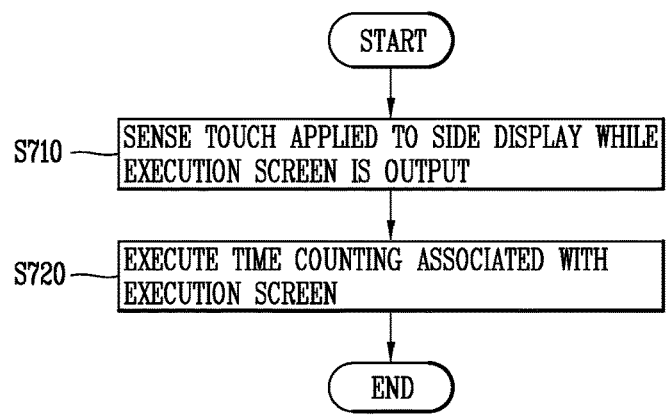
FIG. 7 is a flowchart illustrating a method of executing time counting in a mobile terminal in accordance with one exemplary embodiment disclosed herein.

FIG. 7 is a flowchart illustrating a method of executing time counting in a mobile terminal in accordance with one exemplary embodiment disclosed herein.

As illustrated in FIG. 7, a touch applied to a side display may be sensed while an execution screen is displayed (S710).

The execution screen may refer to screen information, which is output on a display unit 251 as at least one executable function is activated on the terminal. The execution screen, for example, may be a home screen, a lock screen, a graphic user interface (GUI) of a currently-executed application, and the like.

The display unit 251 may be defined by a first area 251a disposed on a front surface of a main body, and a second area 251b extending from the first area 251a and disposed on side surfaces of the main body. A side display may correspond to the second area 251b. The second area 251b may have a left area and a right area disposed on the left and right side surfaces of the terminal, respectively, and the execution screen may be output on an overall area of the first area 251a and the second area 252b of the display unit 251.

Here, for allowing a touch input with respect to the first area 251a and the second area 251b, the display unit 251 may be provided with touch sensors for sensing the touch input. The display unit 251 may output visual information which is configured in a form of an image such as GUI, text, icon and the like. However, the display unit 251 may be converted into a deactivated state after a lapse of a predetermined time or in response to an input of a specific control command.

Here, the touch may be sensed on at least one of the left area and the right area. The following description will be given in detail of an exemplary embodiment according to the present disclosure, under assumption that the touch is sensed on the right area for the sake of explanation.

Afterwards, in response to the sensed touch, the controller 180 may execute the time counting associated with the execution screen (S720).

Here, the controller 180 may select a control function to execute based on the execution screen which is currently output on the display unit 251, and execute the time counting for the selected control function. Time counting with respect to a different control function may be executed according to an execution screen currently output on the display unit 251. For example, when a touch is sensed while a home screen page is output, time counting for activating a sleep mode may be executed. Also, time counting for providing an alarm may be executed when an alarm setting screen for setting the alarm is displayed.

Besides, when the time counting is executed in response to a touch applied to the second area 251b while a first execution screen is displayed and an application different from an application associated with the first execution screen is run, a second execution screen of the different application may be displayed on the first area 251a. While the second execution screen is displayed on the first area 251a, counting information displayed on the second area 251b may be changed according to a lapse of time. When the time counting is ended, the first execution screen may be displayed on the first area 251a, instead of the second execution screen. That is, a conversion from the second execution screen into the first execution screen may be set as a control function.

The controller 180 may calculate a touch point on which the touch has been applied on the second area 251b, and set a predetermined time as a criterion of the time counting based on the calculated touch point. For example, the entire area from the lower end to the upper end of the second area 251b may be divided on the unit time basis, and a time corresponding to the touch point may be set as the predetermined time.

The controller 180 may display counting information on the second area 251b to inform that the time counting is undergoing, and process a function associated with the execution screen when the time counting is ended. The method of executing the time counting and displaying the counting information has been illustrated with reference to FIG. 4, so description thereof will be omitted.

FIGS. 8 9A, 9B and 10 are exemplary views for illustrating the control method of FIG. 7, which are exemplary views illustrating a control of time counting using a touch input applied to a side display.

Figure 8:
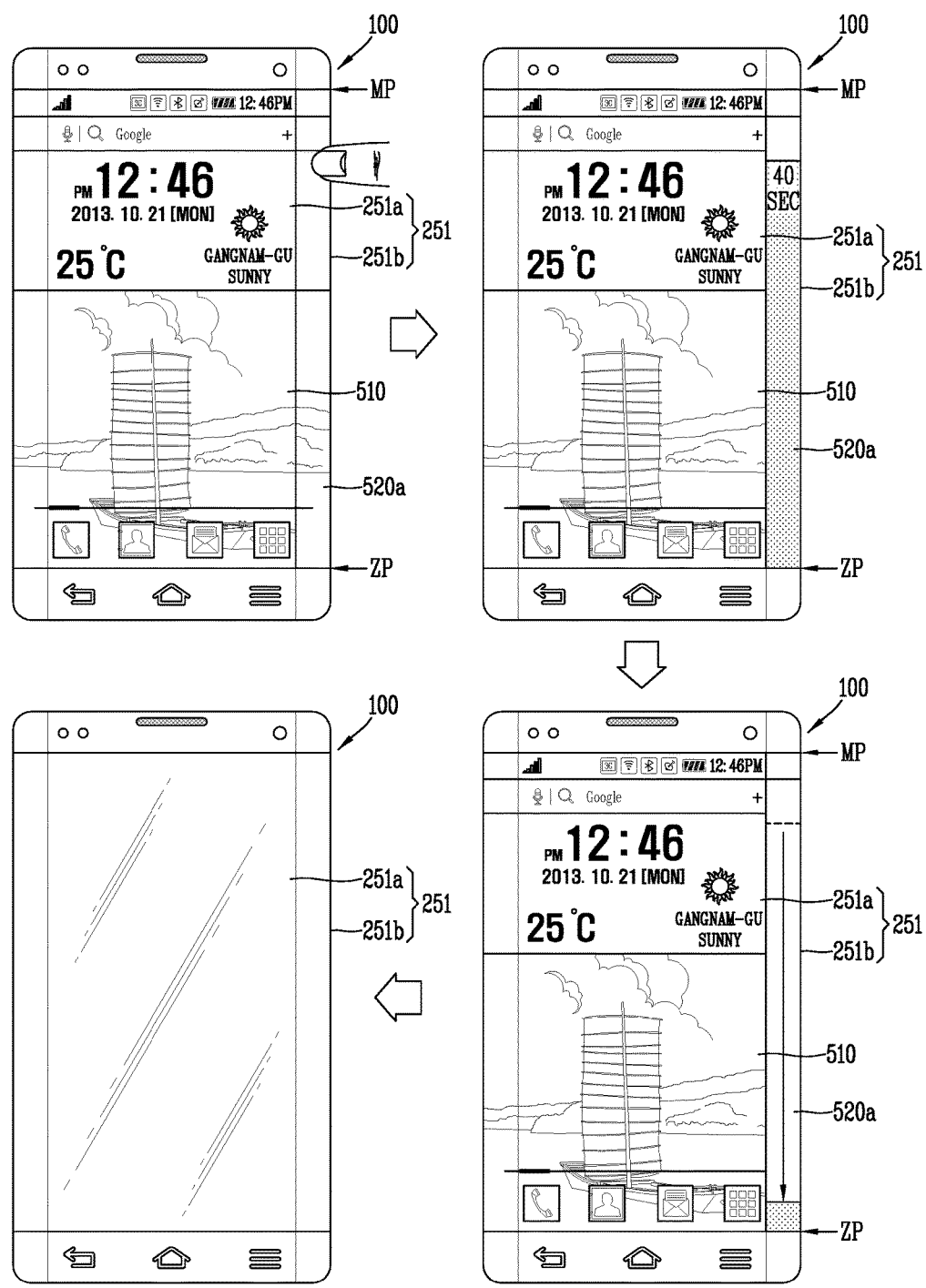
FIGS. 8, 9A, 9B and 10 are exemplary views for illustrating the control method of FIG. 7.

In one example of the control, referring to FIG. 8, when a touch is applied to the second area 251b while screen information, such as a home screen page or the like, is displayed on the display unit 251, time counting for executing a sleep mode may be started.

In response to the start of the time counting, an image may be generated on the second area 251b. The image may be moved down along a lengthwise direction of the terminal. That is, the movement of the image from the upper end to the lower end of the second area 251b may inform of the lapse of the time. Here, a remaining time (for example, '40 seconds') to be counted may be displayed within the image, which may allow the user to be aware of accurate information.

After the lapse of the predetermined time, a control function may be executed and the counting information output on the second area 251b may disappear.

Figure 9A:
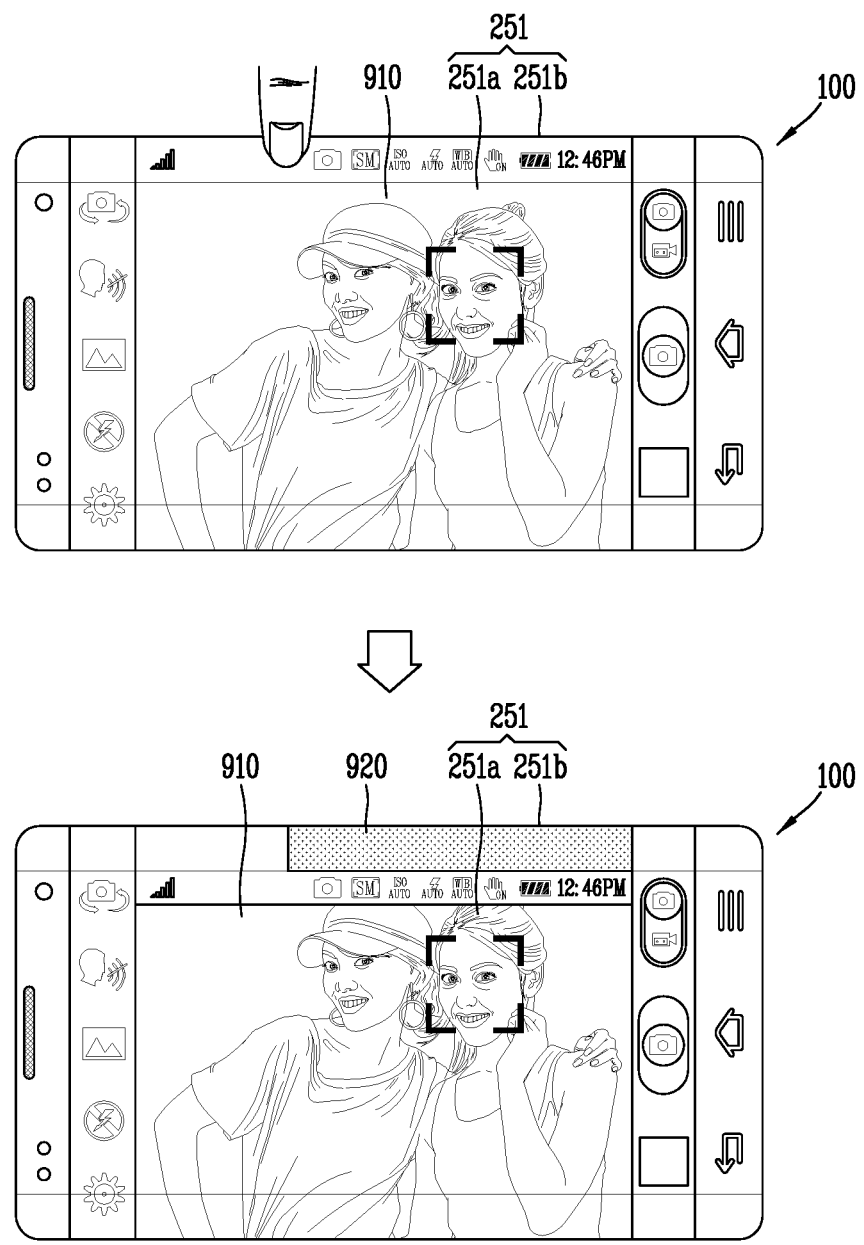

Referring to FIG. 9A, the mobile terminal according to the one exemplary embodiment disclosed herein may include a camera (not illustrated) and the display unit 251, and output an image captured by the camera on the display unit 251. Here, an application associated with the operation of the camera may be executed and an execution screen 910 of the application may be output on the display unit 251. The execution screen 910 may include the camera-captured image, and one or more control objects formed to execute a function associated with the camera operation.

When a touch is applied to one point of the second area 251b while the execution screen 910 is output, the controller 180 may execute time counting for activating a self-timer. Here, the self-timer may refer to a function of automatically working a shutter when a predetermined time elapses, and the controller 180 may set the predetermined time based on a touch point of the applied touch. The controller 180 may also display counting information 920 guiding the time counting on the second area 251b.

Figure 9B:
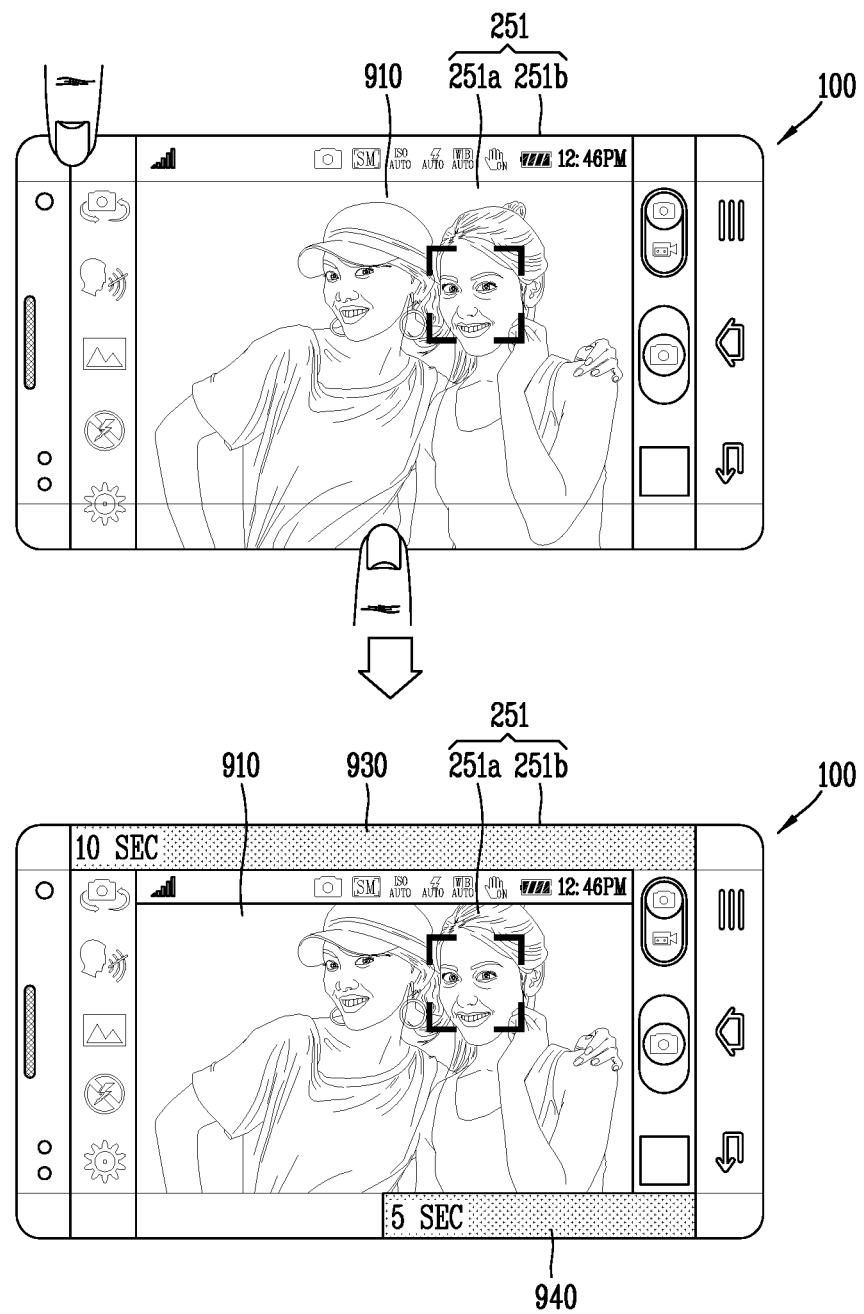

In addition, referring to FIG. 9B, the controller 180 may execute a plurality of time counting based on a plurality of touches applied to the left and right areas, respectively, in a continuous manner. The respective areas may display different pieces of counting information 930 and 940.

For example, when a first touch is applied to the right area and a second touch is applied to the left area in a continuous manner, the controller 180 may execute a first capturing after a lapse of a first time, which corresponds to the point where the first touch has been applied, and then execute a second capturing after a lapse of a second time which correspond to the point where the second touch has been applied. In turn, first counting information related to the first capturing may be displayed on the right area and second counting information related to the second capturing may be displayed on the left area.

The user may execute the self-timer function in such simple manner using the edge area of the display unit 251, and intuitively view a captured time point based on the counting information which is visually changed according to the lapse of the time.

Figure 10:
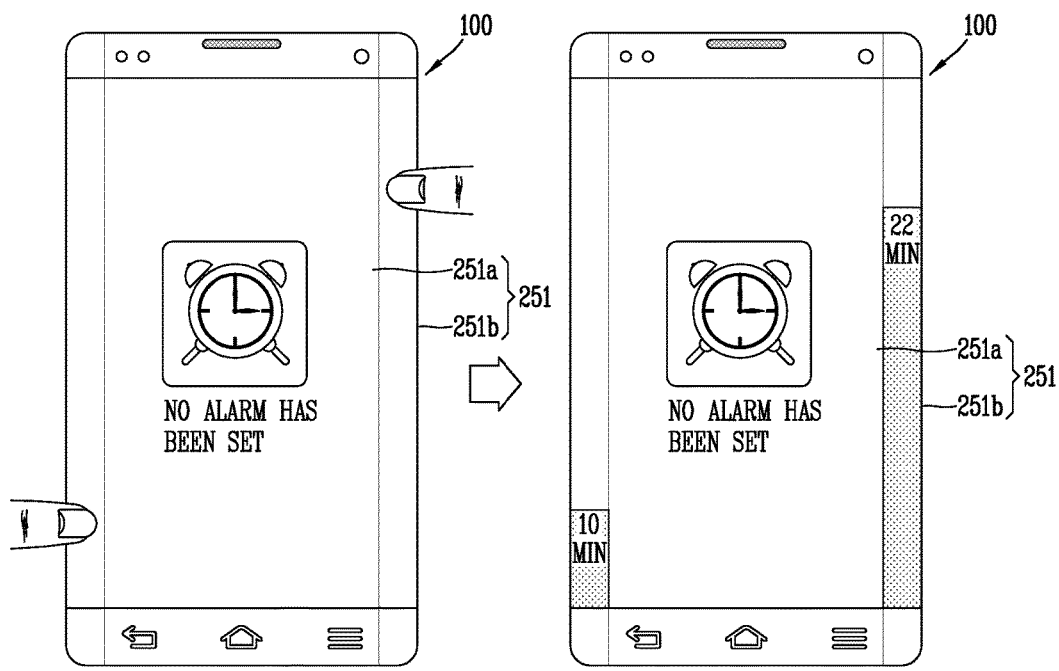

Referring to FIG. 10, an execution screen of an application for outputting an alarm at a preset time may be output on the display unit 251.

Here, the controller 180 may execute time counting for outputting the alarm based on a touch applied to the second area 251*b*, on which the execution screen is output, and display counting information guiding the time counting on the second area 251*b*. When a preset time arrives, the controller 180 may generate an output related to at least one of visible, audible, tactile and olfactory senses using the configuration included in the output unit 150 (see FIG. 1).

Although not illustrated, in various embodiments of setting a predetermined time and executing a control function after the lapse of the predetermined time, the time counting according to the present disclosure may be executed and counting information may be output.

Meanwhile, the mobile terminal according to the one exemplary embodiment disclosed herein may display a graphic object for setting a predetermined time to be counted. Hereinafter, description will be given in detail of a method of displaying the graphic object and setting a predetermined time as a criterion of the time counting based on a user input, with reference to FIG. 11.

Referring to FIG. (a) of FIG. 11, an alarm setting screen for setting an alarm may be output as an execution screen on the display unit 251. The alarm setting screen is merely illustrative for the sake of explanation. However, the present disclosure may be applied to various embodiments without being limited to this.

When a touch is sensed on the second area 251*b*, referring to (b) of FIG. 11, a graphic object 1110 may be output on a location corresponding to a touch point of the applied touch so as to display time information (for example, '60 minutes') corresponding to a max point MP.

The graphic object 1110 may include time information (for example, '20 minutes') corresponding to the touch point.

Continuously, the controller 180 may set a predetermined time for executing time counting based on a user input with respect to the graphic object 1110. For example, when a touch is applied to the graphic object 1110, a time (for example, '20 minutes') corresponding to the point on which the graphic object 1110 is output may be set as the predetermined time.

In another example, referring to (c) of FIG. 11, when a drag is applied to the graphic object 1110, a time corresponding to a point on which the drag is released may be set as the predetermined time (for example, '40 minutes').

Accordingly, the user may conveniently set or reset the predetermined time using the graphic object output on the second area.

Although not illustrated, the controller 180 may stop the time counting and control the counting information to be invisible when inputs applied to the second area in a continuously manner with a time interval are sensed while the counting information is displayed.

Hereinafter, description will be given in detail of a method of outputting a plurality of pieces of counting information on the display unit 251 of the mobile terminal according to the one exemplary embodiment disclosed herein, with reference to FIG. 12.

FIGS. 12A, 12B and 12C are views illustrating a method of displaying a plurality of counting information in a mobile terminal in accordance with one exemplary embodiment disclosed herein.

As illustrated in FIG. 12A, the display unit 251 may include a second area 1222, 1224 for outputting counting information, and a first area 1210 for outputting screen information, which has been most recently output on the display unit 251 before the counting information is output.

The second area may include at least one of an upper end, a lower end, a right end, and a left end corresponding to edges of the display unit 251. Hereinafter, for the sake of explanation, a method of outputting a plurality of pieces of counting information using the exemplary embodiment in which the second area is provided with the left area 1222 and the right area 1224 will be described in detail. However, the present disclosure may not be limited to this.

When the second area is provided with the left area 1222 and the right area 1224 disposed on the left and right side surfaces of the terminal main body, respectively, the left area 1222 and the right area 1224 may be disposed to be spaced apart from each other. The counting information may be output at least one of the left area 1222 and the right area 1224.

Meanwhile, the mobile terminal according to the one exemplary embodiment may output a plurality of pieces of counting information on the second area. The plurality of counting information may show time counting associated with one or more control functions.

For example, referring to FIG. 12B, the plurality of pieces of counting information may guide time counting associated with one control function. When the predetermined time is "5 minutes" and the time counting has progressed to "one minute and one second," the remaining time without being counted may correspond to "3 minutes and 59 seconds." Here, counting information on the minute basis may be output as first counting information 1232 on the left area and counting information on the second basis may be output as second counting information 1234 on the right area.

In another example, referring to FIG. 12C, each of the plurality of counting information may guide time counting associated with a different control function. First counting information 1242 guiding an execution of a first control function after a first predetermined time may be output on the left area, and second counting information 1244 guiding an execution of a second control function after a second predetermined time may be output on the right area. That is, according to the first counting information 1242, the first control function may be executed "34 seconds" later from the moment (or a current time point), and the second control function may be executed "49 seconds" later from the moment (or a current time point). Here, information related to a control function to be executed may be output along with the counting information.

Meanwhile, in the mobile terminal according to the one exemplary embodiment disclosed herein, the controller 180 may change a set value related to counting information, which has been output based on a user input with respect to the counting information. Hereinafter, a method of changing counting information in the mobile terminal will be described in detail with reference to FIGS. 13A, 13B, 14A and 14B.

Figure 13A:
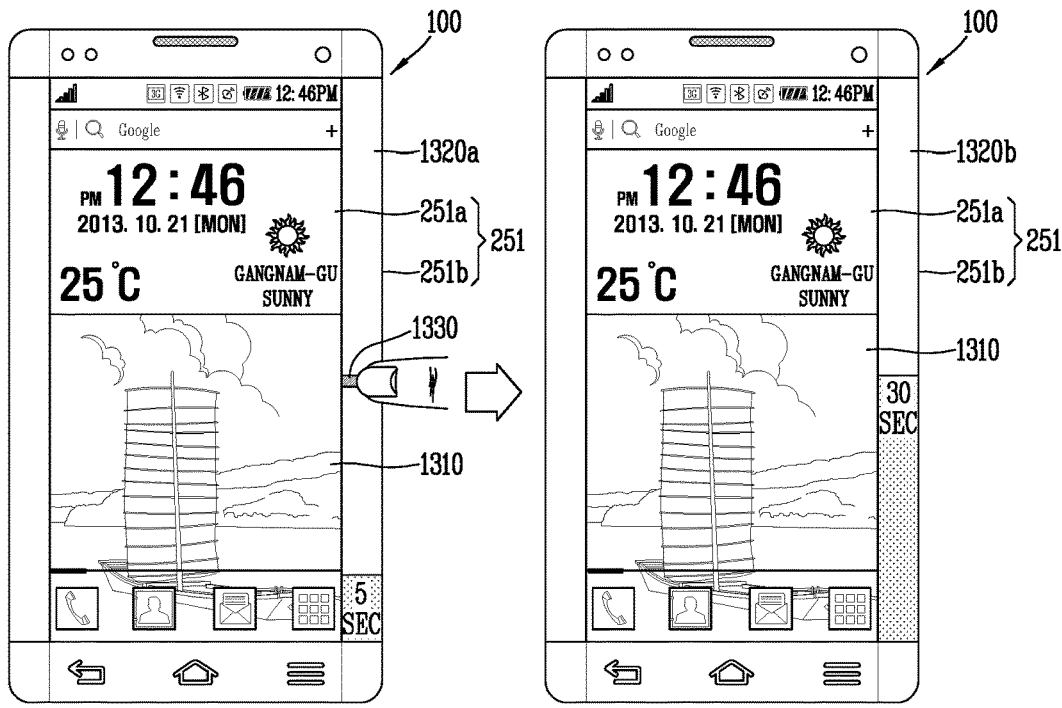

As illustrated in FIG. 13A, the controller 180 may output counting information on at least a portion of the second area of the display unit 251. The counting information may be varied according to a lapse of time for a predetermined time. For example, the counting information may be a progress bar which matches an overall section of the predetermined time. That is, the counting information may include information related to an entire time to be counted, a counted time and/or a remaining time without being counted.

While the counting information is output, a user input may be applied to the counting information. For example, as illustrated in FIG. 13A, at least one point may be selected from the counting information. The controller 180 may select at least one point of the counting information based on a touch input applied to the counting information output on the display unit 251. The controller 180 may display a touch object 1330 indicating the selected point on the counting information.

At least one point may correspond to a specific time of an entire time to be counted. That is, when a touch input is applied to the counting information, the controller 180 may decide a specific time corresponding to the touch-applied point. For example, when a max point is set to 60 seconds, the controller 180 may decide a time corresponding to the touch-applied time within the range of 60 seconds to 0 second.

Next, the controller 180 may reset a time to be counted (or a remaining time) for executing a control function, based on a touch input. For example, when a preset time is 60 seconds and a remaining time to be counted is 5 seconds, a touch input may be applied to a point corresponding to 30 seconds. At this time, the controller 180 may reset the remaining time for executing the control function from 5 seconds to 30 seconds. In addition, counting information output on the display unit 251 may be changed based on the reset time. That is, the counting information may vary according to a length of the reset remaining time (1320*a*→1320*b*).

Figure 13B:
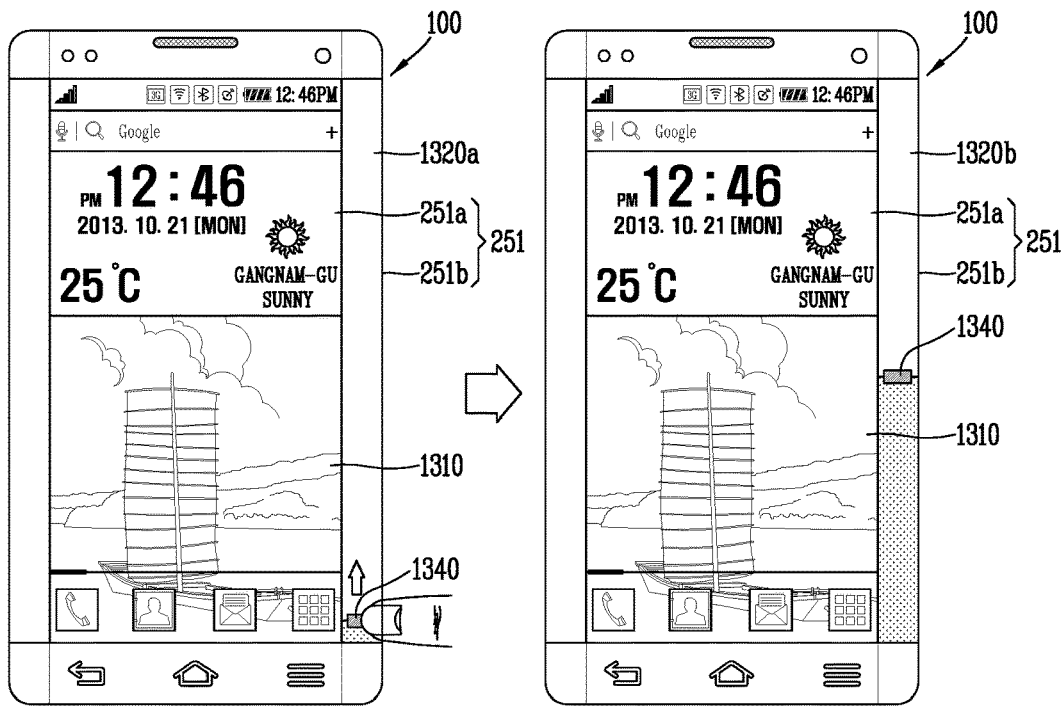

In another example related to a user input, referring to FIG. 13B, counting information may include a graphic object 1340 which indicates a time to be counted (or a remaining time).

Here, a user input which continuously moves the graphic object 1340 from a first output position to a second position may be applied. In this state, the controller 180 may decide a specific time corresponding to the second position, and reset the remaining time for executing a control function to the decided time.

The controller 180 may also reset a predetermined time (or an overall time range of counting information, starting from a start point to an end point) as well as the remaining time to be counted, based on a user input.

For example, as illustrated in (a) of FIG. 14A, when a pinch-out (first and second touches are applied and at least one of the first and second touches is moving far away from an initially-applied point) is applied to counting information, the controller 180, as illustrated in (b) of FIG. 14A, may reset a predetermined time included in the counting information from "10 seconds" to "5 seconds." The controller 180 may reduce the predetermined time in proportion to a distance that the first and second touches are far away from each other in view of the pinch-out.

In another example, as illustrated in (a) of FIG. 14B, a pinch-in (first and second touches are applied and at least one of the first and second touches is moving close to the other one from an initially-applied point) is applied to counting information, the controller 180, as illustrated in (b) of FIG. 14B, may reset a predetermined time included in the counting information from "10 seconds" to "20 seconds." The controller 180 may increase the predetermined time in proportion to a distance that the first and second touches are close each other in view of the pinch-in.

In one exemplary embodiment of changing a set value related to counting information, under a state that a max point MP is set to 60 seconds and a remaining time to be counted is 20 seconds, a user may reset the remaining time to 120 seconds. The resetting method may be explained as follows. First, the user may reset the time of the max point MP from 60 seconds to a time longer than 120 seconds in a pinch-in manner. And, the user may reset the remaining time to be counted to 120 seconds by applying a touch to a point corresponding to 120 seconds. Accordingly, the controller 180 may execute a control function related to an operation of the terminal after 120 seconds, other than 20 seconds.

Meanwhile, a mobile terminal illustrated in FIG. 15 may further include a cover for covering a front surface of a main body, and output counting information in a different manner according to a state of the cover. Hereinafter, description will be given of an embodiment of including a cover for covering a front surface of a display unit in a mobile terminal having the display unit partially bent.

FIG. 15 is a view illustrating a method of outputting counting information in a mobile terminal having a display unit partially bent in accordance with one exemplary embodiment.

As illustrated in FIG. 15, a display unit 251 disposed on a front surface of a main body may be partially bent to be formed on side surfaces of the main body. That is, the display unit 251 may include a side area disposed on the side surfaces and a front area disposed on the front surface. The side and front areas may be connected into a shape without a physical boundary.

The mobile terminal 100 may include a cover 1510 which is rotatably coupled to the main body between a first state of being disposed to cover the front surface of the main body and a second state of being disposed in parallel to the front surface. When the cover 1510 is placed in the first state, the front surface of the display unit 251 may be shielded by the cover 1510.

The controller 180 may be provided with a sensing unit on the front surface of the main body, to sense whether or not the cover 1510 is laid in the first state. When the cover 1510 corresponds to the first state, the controller 180 may deactivate the display unit 251 to increase battery efficiency.

Meanwhile, time counting related to a terminal operation may be executed in the first state. For example, when a control function, such as "go off the alarm 1 hour later" has been set, the controller 180 may execute time counting, irrespective of the state of the cover 1510. Here, when the cover 1510 is laid in the first state, the controller 180 may output counting information on the side area of the display unit 251, and deactivate the front area of the display unit 251. That is, the controller 180 may partially activate or deactivate the display unit 251.

In such a manner, the user may check counting information using the side area of the display unit 251 even in the state that the front area of the display unit 251 is shielded by the cover. In addition, by employing the aforementioned methods illustrated in FIGS. 13A, 13B, 14A and 14B, the user may change, in an easy fast manner, a set value related to the counting information displayed on the side area of the display unit 251.

In the meantime, in a mobile terminal according to one exemplary embodiment, time counting may be executed based on a touch applied to a second area, counting information for guiding the time counting may be output, and setting information for guiding a set value related to an execution screen output on the display unit 251 may be displayed based on a touch applied to the second area. Hereinafter, a method of changing a set value related to an execution screen will be described in detail with reference to FIGS. 16A to 16C.

First, the controller 180 may output an execution screen, on the display unit 251, in response to an execution of one or more functions. Afterwards, when a touch is applied to the second area 251*b* of the first and second areas 251*a* and 251*b* of the display unit 251, as illustrated in FIG. 16A, setting information (for example, "50%") for guiding a set value related to the execution screen may be output.

The set value related to the execution screen, for example, may be at least one of brightness of the display unit 151, audio output strength of the audio output module 153, a scale of a map, a zoom of a camera, and strength of vibration. The setting information may be changed in various manners based on an executed function and an execution screen of the function.

Here, the setting information may be output on the second area 251b in a shape of a progress bar, as similar to the counting information illustrated in FIG. 4.

Also, in the exemplary embodiment illustrated in FIGS. 11 to 14, the embodiment of changing the set value related to the counting information may be equally applied even to the setting information output on the second area 251b. That is, the controller 180 may change a value related to the setting information based on a touch input applied to the second area 251b while the setting information is displayed on the second area 251b.

For example, as illustrated in FIG. 16A, when a touch is applied to the second area 251b while an execution screen is output, the controller 180 may display setting information (50%) related to brightness of the execution screen. Also, the controller 180 may change (50%→20%) the set value related to the brightness of the execution screen based on at least one of a touch and a drag applied to the second area 251b, and then output information (20%) related to the changed set value on the second area 251b.

Meanwhile, the controller 180, as illustrated in FIG. 16B, may change a set value related to an execution screen output on the display unit 251, immediately in response to a touch applied to the second area 251b. That is, when a touch is sensed on the second area 251b, the controller 180 may change a value related to the execution screen based on the touch point, and output information (20%) related to the changed set value on the second area 251b. Here, a lower end of the second area 251b may correspond to a value of "0%" of the set value, and an upper end thereof may correspond to a value of "100%" of the set value. The values corresponding to the lower and upper ends may vary in various manners.

The second area 251b may be provided with a left area and a right area, and the left area and the right area may be set as areas for changing different set values. For example, the left area, as illustrated in FIG. 16B, may correspond to an area for changing a set value related to brightness of the display unit 251, and the right area, as illustrated in 16C, may correspond to an area for changing a set value related to output strength of the audio output module 251. In another example, while a video is played back, the controller 180 may adjust brightness of the video using a touch applied to the left area, and adjust a volume of a sound using a touch applied to the right area.

As described above, a mobile terminal according to the present disclosure may provide appropriate information according to a state of the mobile terminal, and change a related set value, thereby enhancing user convenience.

Also, when time counting is executed in relation to an operation of a mobile terminal according to one exemplary embodiment disclosed herein, counting information related to the time counting may be provided in a changing manner according to a lapse of a time. Therefore, the user may use a user interface which allows for briefly checking the time counting progressing in the mobile terminal.

In addition, a mobile terminal according to one exemplary embodiment disclosed herein may execute a control function after a preset time elapses, in response to a touch applied to an edge area of a display unit. That is, a timer mode in which a function is executed after a predetermined time may be executed by a simple touch operation. Therefore, the user may activate the timer mode merely by touching one point of the edge area of the display unit. Here, the executed control function may be changed according to an application which has been executed before the touch is applied.

In this manner, front and side display units may operate cooperative to each other, so as to provide a new type of user convenience.

Further, in accordance with one embodiment of the present disclosure, the aforementioned methods can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The configurations and methods of the mobile terminal and the control method thereof in the aforesaid embodiments may not be limitedly applied, but such embodiments may be configured by a selective combination of all or part of the embodiments so as to implement many variations.

What is claimed is:

1. A mobile terminal comprising:
a main body comprising a front surface and side surfaces;
a camera disposed at the main body;
a display unit comprising a first area disposed on the front surface and a second area extending from the first area and disposed on at least one of the side surfaces, wherein the display unit is configured to output an execution screen in response to an execution of a function on at least one of the first area and the second area; and
a controller configured to execute a function related to changing a set value when a first touch is applied to an arbitrary point of the second area while the execution screen is output,
wherein the execution screen corresponds to an image capturing function via the camera,
wherein the second area comprises a left area and a right area arranged at left and right side surfaces of the main body, respectively,
wherein when the first touch is applied to one of the left area or the right area and a second touch is applied consecutively to the other of the left area or the right area, the controller is further configured to execute a first image capturing after a lapse of a first time corresponding to a point of the first touch along the one of the left area or the right area and execute a second image capturing after a lapse of a second time corresponding to a point of the second touch along the other of the left area or the right area, and
wherein first counting information related to the first image capturing is output on the one of the left area or the right area and second counting information related to the second image capturing is output on the other of the left area or the right area.

2. The terminal of claim 1, wherein the controller is further configured to output information related to the set value on the second area in response to the first touch applied to the arbitrary point.

3. The terminal of claim 2, wherein the controller is further configured to:

output a bar-shaped image formed along the second area in response to the first touch applied to the arbitrary point; and output the information related to the set value on the bar-shaped image, wherein a length of the bar-shaped image differs according to the set value.

4. The terminal of claim 3, wherein the controller is further configured to:

set a minimum value corresponding to a first end of the second area and a maximum value corresponding to a second end of the second area when the function related to changing the set value is executed; and change the first counting information or the second counting information to a particular value corresponding to a touch point of a third touch between the first end and the second end of the second area.

5. The terminal of claim 4, wherein the controller is further configured to adjust the length of the bar-shaped image based on the third touch.

6. The terminal of claim 4, wherein the controller is further configured to update the information related to the set value based on the third touch.

7. The terminal of claim 2, wherein the controller is further configured to output the execution screen on the first area and the information related to the set value on the second area when the first touch is applied to the arbitrary point of the second area while the execution screen is output on both the first area and the second area.

8. The terminal of claim 7, wherein a size of a content included on the execution screen is changed when an output position of the execution screen is changed from both the first area and the second area to only the first area.

9. The terminal of claim 2, wherein the controller is further configured to output the information related to the set value on the left area or the right area corresponding to a location of the first touch.

10. The terminal of claim 9, wherein:

the information related to the set value corresponds to the lapse of the first time; and the controller is further configured to output information related to another set value corresponding to the lapse of the second time on the other of the left area or the right area.

11. The terminal of claim 2, wherein the controller is further configured to stop the output of the information related to the set value when a plurality of consecutive touch inputs are received within a time interval.

12. The terminal of claim 1, wherein:

changing the set value corresponds to changing a predetermined time for executing the first image capturing; and wherein the controller is further configured to:

change the predetermined time in response to the first touch;

start counting the lapse of the first time and output counting information indicating status of the lapse of the first time on the second area when the first touch is released; and execute the first image capturing after a lapse of the predetermined time.

13. The terminal of claim 12, wherein an image with a length which is gradually changed according to a lapse of time is output on the second area when the counting the lapse of the first time is started, and the counting information is output within the image.

14. The terminal of claim 12, wherein the controller is further configured to deactivate the first area and continue to output the counting information on the second area when the front surface is covered with an object while the counting information is output.

15. The terminal of claim 12, wherein the counting information corresponds to a remaining time for executing the function associated with the execution screen, and wherein the controller is further configured to reset the remaining time based on a newly-applied touch when the newly-applied touch is applied to the second area while the counting information is output.

16. The terminal of claim 1, wherein the controller is further configured to:

output a video as the execution screen on at least the first area or the second , in response to an execution of a video reproduction function;

output setting information for guiding a volume level of the video on the second area in response to another first touch applied to the arbitrary point while the video is output; and change the volume level of the video in response to another second touch and update the output setting information based on the changed volume level.

* * * * *